United States Patent
Bjorsell et al.

(10) Patent No.: US 8,630,234 B2
(45) Date of Patent: Jan. 14, 2014

(54) MOBILE GATEWAY

(75) Inventors: Johan Emil Viktor Bjorsell, Vancouver (CA); Maksym Sobolyev, New Westminster (CA); Pentti Kalevi Huttunen, Vancouver (CA); Emil Malak, Vancouver (CA)

(73) Assignee: Digifonica (International) Limited, Vancouver (CA)

( * ) Notice: Subject to any disclaimer, the term of this patent is extended or adjusted under 35 U.S.C. 154(b) by 338 days.

(21) Appl. No.: 13/056,277

(22) PCT Filed: Jul. 28, 2009

(86) PCT No.: PCT/CA2009/001062
§ 371 (c)(1),
(2), (4) Date: Jan. 27, 2011

(87) PCT Pub. No.: WO2010/012090
PCT Pub. Date: Feb. 4, 2010

(65) Prior Publication Data
US 2011/0122827 A1    May 26, 2011

Related U.S. Application Data

(60) Provisional application No. 61/129,898, filed on Jul. 28, 2008.

(51) Int. Cl.
*H04W 4/00* (2009.01)
(52) U.S. Cl.
USPC ........................................ 370/328; 455/432.1
(58) Field of Classification Search
USPC .................................................. 370/310–338
See application file for complete search history.

(56) References Cited

U.S. PATENT DOCUMENTS

| 4,916,491 A | 4/1990 | Katoh |
| 4,992,971 A | 2/1991 | Hayashi |
| 5,146,491 A | 9/1992 | Silver et al. |

(Continued)

FOREIGN PATENT DOCUMENTS

| CA | 2249668 | 4/1999 |
| EP | 1 389 862 A1 | 2/2004 |

(Continued)

OTHER PUBLICATIONS

The International Search Report and Written Opinion mailed on Mar. 12, 2010 for corresponding PCT Application No. PCT/CA2009/001062.

(Continued)

*Primary Examiner* — Xavier S Wong
*Assistant Examiner* — M Mostazir Rahman
(74) *Attorney, Agent, or Firm* — Knobbe, Martens, Olson & Bear LLP

(57) ABSTRACT

A method of initiating a call to a callee using a mobile telephone involves: receiving, from a user of the mobile telephone, a callee identifier associated with the callee; transmitting an access code request message to an access server, said access code request message including said callee identifier; receiving an access code reply message from the access server in response to said access code request message, said access code reply message including an access code different from said callee identifier and associated with said callee identifier; and initiating a call with the mobile telephone using said access code to identify the callee.

78 Claims, 17 Drawing Sheets

(56) References Cited

U.S. PATENT DOCUMENTS

| | | |
|---|---|---|
| 5,247,571 A | 9/1993 | Kay et al. |
| 5,303,297 A | 4/1994 | Hillis |
| 5,359,642 A | 10/1994 | Castro |
| 5,425,085 A | 6/1995 | Weinberger et al. |
| 5,440,621 A | 8/1995 | Castro |
| 5,454,030 A * | 9/1995 | de Oliveira et al. ...... 379/100.08 |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,712,907 A | 1/1998 | Wegner et al. |
| 5,724,355 A | 3/1998 | Bruno et al. |
| 5,726,984 A | 3/1998 | Kubler et al. |
| 5,737,414 A | 4/1998 | Walker et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 6,005,926 A | 12/1999 | Mashinsky |
| 6,014,379 A | 1/2000 | White et al. |
| 6,021,126 A | 2/2000 | White et al. |
| 6,052,445 A | 4/2000 | Bashoura et al. |
| 6,058,300 A | 5/2000 | Hanson |
| 6,069,890 A | 5/2000 | White et al. |
| 6,073,013 A | 6/2000 | Agre et al. |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A | 11/2000 | Reich et al. |
| 6,188,752 B1 | 2/2001 | Lesley |
| 6,282,574 B1 | 8/2001 | Voit |
| 6,298,062 B1 | 10/2001 | Gardell et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,507,644 B1 | 1/2003 | Henderson et al. |
| 6,597,686 B1 | 7/2003 | Smyk |
| 6,674,745 B1 * | 1/2004 | Schuster et al. ............... 370/352 |
| 6,724,860 B2 | 4/2004 | Stumer et al. |
| 6,744,858 B1 | 6/2004 | Ryan et al. |
| 6,766,159 B2 | 7/2004 | Lindholm |
| 6,798,767 B1 | 9/2004 | Alexander et al. |
| 6,819,929 B2 | 11/2004 | Antonucci et al. |
| 6,954,453 B1 | 10/2005 | Schindler |
| 6,963,557 B2 | 11/2005 | Knox |
| 7,046,658 B1 | 5/2006 | Kundaje |
| 7,055,174 B1 | 5/2006 | Cope et al. |
| 7,068,772 B1 | 6/2006 | Widger et al. |
| 7,079,526 B1 * | 7/2006 | Wipliez et al. ................ 370/352 |
| 7,120,682 B1 | 10/2006 | Salama |
| 7,212,522 B1 | 5/2007 | Shankar et al. |
| 7,454,510 B2 | 11/2008 | Kleyman et al. |
| 7,950,046 B2 | 5/2011 | Kropivny |
| 8,116,307 B1 | 2/2012 | Thesayi et al. |
| 2002/0051518 A1 | 5/2002 | Bondy et al. |
| 2002/0116464 A1 | 8/2002 | Mak |
| 2002/0122391 A1 * | 9/2002 | Shalit ............................ 370/260 |
| 2003/0200311 A1 | 10/2003 | Baum |
| 2003/0219103 A1 | 11/2003 | Rao et al. |
| 2004/0022237 A1 * | 2/2004 | Elliott et al. .................. 370/356 |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0240439 A1 | 12/2004 | Castleberry et al. |
| 2004/0255126 A1 | 12/2004 | Reith |
| 2005/0025043 A1 | 2/2005 | Mussman et al. |
| 2005/0083911 A1 | 4/2005 | Grabelsky et al. |
| 2005/0094651 A1 | 5/2005 | Lutz et al. |
| 2005/0169248 A1 | 8/2005 | Truesdale et al. |
| 2005/0174937 A1 | 8/2005 | Scoggins et al. |
| 2005/0177843 A1 | 8/2005 | Williams |
| 2006/0072547 A1 | 4/2006 | Florkey et al. |
| 2006/0072550 A1 | 4/2006 | Davis et al. |
| 2006/0093135 A1 | 5/2006 | Fiatal et al. |
| 2006/0111116 A1 | 5/2006 | Palmer et al. |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0209768 A1 | 9/2006 | Yan et al. |
| 2006/0258328 A1 | 11/2006 | Godoy |
| 2006/0264200 A1 | 11/2006 | Laiho et al. |
| 2007/0036143 A1 | 2/2007 | Alt et al. |
| 2007/0112964 A1 * | 5/2007 | Guedalia et al. ............... 709/227 |
| 2007/0127676 A1 | 6/2007 | Khadri |
| 2007/0253418 A1 | 11/2007 | Shiri et al. |
| 2008/0037715 A1 | 2/2008 | Prozeniuk et al. |
| 2008/0056235 A1 * | 3/2008 | Albina et al. .................. 370/352 |
| 2008/0063153 A1 | 3/2008 | Krivorot et al. |
| 2009/0028146 A1 | 1/2009 | Kleyman et al. |
| 2009/0292539 A1 | 11/2009 | Jaroker |
| 2009/0325558 A1 | 12/2009 | Pridmore et al. |
| 2010/0086119 A1 | 4/2010 | De Luca et al. |

FOREIGN PATENT DOCUMENTS

| | | |
|---|---|---|
| EP | 1 389 862 B1 | 11/2004 |
| WO | WO 01/89145 A2 | 11/2001 |
| WO | WO 2007/044454 A2 | 4/2007 |
| WO | WO 2008/052340 A1 | 5/2008 |
| WO | WO 2008/064481 A1 | 6/2008 |
| WO | WO 2008/116296 A1 | 10/2008 |

OTHER PUBLICATIONS

The International Preliminary Report on Patentability and Written Opinion of the International Searching Authority mailed Feb. 10, 2011 for related PCT Application No. PCT/CA2009/001062., Feb. 10, 2011.

The International Preliminary Report on Patentability mailed Feb. 13, 2009 for corresponding PCT/CA2007/002150.

The International Preliminary Report on Patentability mailed May 14, 2009 for related PCT/CA2007/001956.

The International Search Report and Written Opinion of the International Searching Authority completed Feb. 6, 2008 for corresponding PCT/CA2007/001956.

The International Search Report and Written Opinion of the International Searching Authority completed Jun. 6, 2008 for corresponding PCT/CA2008/000545.

The International Search Report completed on Mar. 3, 2008 for corresponding PCT/CA2007/002150.

(56) References Cited

OTHER PUBLICATIONS

The Written Opinion and International Search Report completed on Jun. 17, 2010 for related PCT Application No. PCT/CA2009/001317.
Cisco. "Lawful Intercept Requirements Summary." http://www.faqs.org/rfcs/rfc3924.html. Nov. 8, 2006.
ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
F. Baker et al. "RFC 3924—Cisco Architecture for Lawful Intercept in IP Networks." Oct. 2004.
M. Handley et al. "RFC 2543—SIP: Session Initiation Protocol." Mar. 1999.
Sippy SIP B2BUA. "About Sippy RTPproxy." http://www.rtpproxy.org. Jul. 15, 2009.
The International Preliminary Report on Patentability issued on Sep. 29, 2009 for PCT/CA2008/000545.
The International Preliminary Report on Patentability issued on Mar. 20, 2012 for PCT/CA2009/001317.
Townsley, et al.; "RFC 2661—Layer Two Tunneling Protocol 'L2TP'", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of_NANP_area_codes; printed Jun. 20, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
Rosenberg, et al.; "RFC 3261—SIP: Session Initiation Protocol", Jun. 2002.
Lind AT&T S: "ENUM Call Flows for VoIP Interworking; draft-lind-enum-callflows-03.txt", Feb. 1, 2002, No. 3, pp. 1-17.
IETF ENUM WG R STASTNY OEFEG Informational Numbering for VoIP and Other IP Communications: "Numbering for VoIP and other IP Communications, draft-stastny-enum-numbering-voip-00.txt", Oct. 1, 2003, pp. 1-43.
Supplementary European Search Report for European Application No. 07816106 dated Jun. 18, 2012.
EPO, Supplementary European Search Report, dated Nov. 2, 2012, Application No. 07855436.7, corresponds to U.S. Appl. No. 12/517,026.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roaming, Jul. 16, 2013.

\* cited by examiner

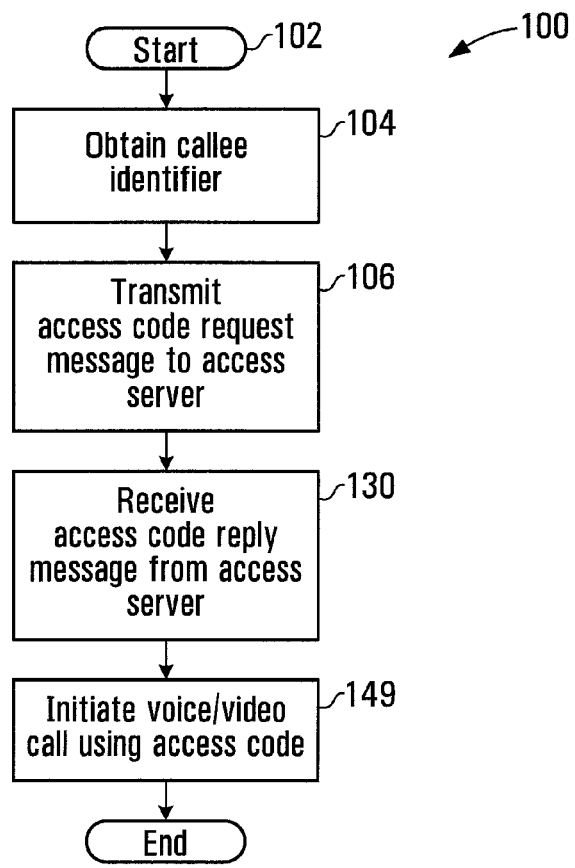
FIG. 3
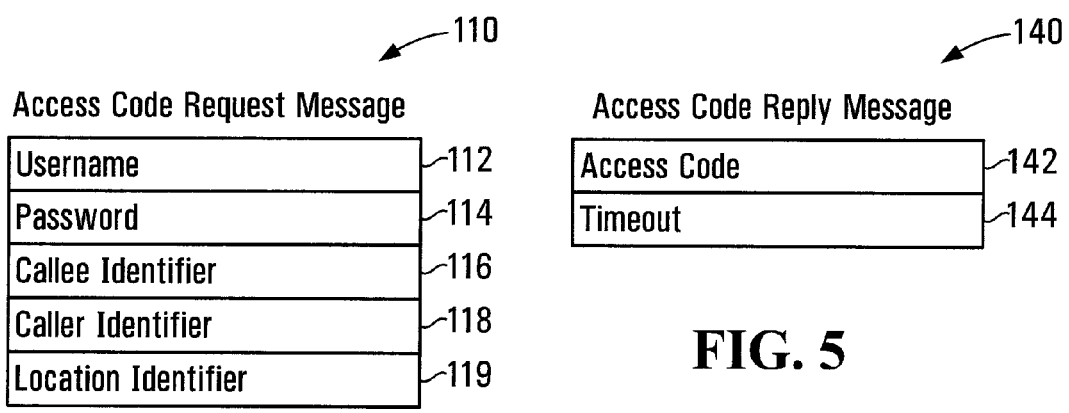
FIG. 4
FIG. 5

Dialing Profile for a User     ⟵ 200

| | | |
|---:|:---|:---|
| 202 — | Username | Assigned on Subscription |
| 204 — | Domain | Domain Associated with User |
| 206 — | NDD | 1 |
| 208 — | IDD | 011 |
| 210 — | Country Code | 1 |
| 212 — | Local Area Codes | 604;778 |
| 214 — | Caller Minimum Local # Length | 10 |
| 216 — | Caller Maximum Local # Length | 10 |
| 218 — | Reseller | Retailer |
| 220 — | Maximum # of concurrent calls | Assigned on Subscription |
| 222 — | Current # of concurrent calls | Assigned on Subscription |
| 224 — | Default Local Calling Area Identifier | Assigned on Subscription |

FIG. 9

| | 171 | 173 | 175 | 177 | 179 | 183 |
|---|---|---|---|---|---|---|
| | Local Calling Area Identifier | Access Code | Channel Identifier | Callee Identifier | Caller Identifier | Caller Username |
| 172 | XXXX | 1-604-345-1212 | 20 | | | |
| 174 | XXXX | 1-604-345-2323 | 22 | | | |
| 176 | XXXX | 1-604-345-3434 | 24 | | | |
| 178 | XXXX | 1-416-234-4646 | XX | 1-403-789-1234 | 1-416-444-1441 | 2001 1050 8667 |
| 180 | XXXX | 1-416-234-6868 | XY | 1-604-321-1234 | 1-416-444-1234 | 2001 1050 4141 |

170

| 181 | 182 |
|---|---|
| Timeout | Timestamp |
| 10 | 06-15-2008 10:31 |
| 10 | 06-15-2008 14:21 |

FIG. 10

SIP Invite Request Process

RC Request Message — 360

- 362 — Caller    1-604-678-1234@20.14.102.5
- 364 — Callee    1-604-345-1212
- 366 — Digest    XXXXXXX
- 368 — Call ID    FF10@20.14.102.5

Gateway Node Association Table ← 480

| Gateway IP Address | Node Identifier |
|---|---|
| 20.14.102.5 | 2 |
| 104.12.131.12 | 5 |

FIG. 19

MOBILE GATEWAY

This application is a national phase entry of PCT/CA2009/001062, filed Jul. 28, 2009, which claims priority to U.S. Provisional Application No. 61/129,898, filed Jul. 28, 2008, both of which are incorporated by reference in their entirety.

BACKGROUND OF THE INVENTION

1. Field of Invention

This invention relates generally to telecommunication, and more particularly to methods, systems, apparatuses, and computer readable media for initiating or enabling a call with a mobile telephone to a callee.

2. Description of Related Art

Mobile telephone service providers often charge significant fees for long distance telephone calls, particularly when the mobile telephone is roaming in another mobile telephone service provider's network.

One known technique for avoiding the long distance charges of mobile telephone service providers is to use a "calling card". A "calling card" may permit the user of the mobile telephone to place a call to a local telephone number or to a less-expensive telephone number (such as a toll-free number, for example) instead of placing the call directly to the callee. The user may thus avoid the long distance charges of the mobile telephone service provider, which may be higher than the charges for using the "calling card". However, this technique can be cumbersome and undesirable, because it may require the user of the mobile telephone to follow a number of complicated or cumbersome steps in order to initiate a call to the callee, for example.

SUMMARY OF THE INVENTION

In accordance with one aspect of the invention there is provided a method of initiating a call to a callee using a mobile telephone. The method involves receiving, from a user of the mobile telephone, a callee identifier associated with the callee; transmitting an access code request message to an access server, the access code request message including the callee identifier; receiving an access code reply message from the access server in response to the access code request message, the access code reply message including an access code different from the callee identifier and associated with the callee identifier; and initiating a call with the mobile telephone using the access code to identify the callee.

Transmitting may involve transmitting the access code request message to the access server on a non-voice network.

Transmitting may involve transmitting a location identifier of a location associated with the mobile telephone to the access server.

Transmitting the location identifier may involve transmitting an IP address of the mobile telephone in a wireless IP network.

Transmitting the location identifier may involve transmitting an identifier of a wireless voice signal station in wireless communication with the mobile telephone.

Transmitting the location identifier may involve transmitting a user-configured identifier of a location associated with the mobile telephone.

Receiving the access code reply message may involve receiving the access code reply message from the access server on a non-voice network.

Receiving the access code reply message may involve receiving, in the access code reply message, an access code temporarily associated with the callee identifier.

Receiving the access code reply message may involve receiving, in the access code reply message, a telephone number identifying a channel operably configured to cooperate with an IP network to cause a call involving the mobile telephone and the callee to be routed through the IP network.

Initiating the call may involve engaging a routing controller to route the call on the IP network to the callee.

The method may further involve: receiving from the mobile telephone the access code request message; communicating with a routing controller to obtain from the routing controller the access code wherein the access code identifies a channel and is useable by the mobile telephone to cause the routing controller to establish a call to the callee using the channel; and transmitting the access code reply message to the mobile telephone.

In accordance with another aspect of the invention, there is provided a mobile telephone. The mobile telephone includes: provisions for receiving, from a user of the mobile telephone, a callee identifier associated with the callee; transmitting provisions for transmitting an access code request message to an access server, the access code request message including the callee identifier; provisions for receiving an access code reply message from the access server in response to the access code request message, the access code reply message including an access code different from the callee identifier and associated with the callee identifier; and provisions for initiating a call using the access code to identify the callee.

The transmitting provisions may include a non-voice network interface for transmitting the access code request message to the access server on a non-voice network.

The access code request message may further include a location identifier of a location associated with the mobile telephone.

The location identifier may include an IP address of the mobile telephone in a wireless IP network.

The location identifier may include an identifier of a wireless voice signal station in wireless communication with the mobile telephone.

The location identifier may include a user-configured identifier of a location associated with the mobile telephone.

The provisions for receiving an access code reply message may include a non-voice network interface for receiving the access code reply message on a non-voice network.

The access code may include a telephone number.

The means for initiating may involve a mobile telephone network interface.

In accordance with another aspect of the invention, there is provided a system for initiating a call to a callee. The system includes the mobile telephone, a routing controller, and an access server. The access server includes: provisions for receiving from the mobile telephone the access code request message; provisions for communicating with the routing controller to obtain from the routing controller the access code wherein the access code identifies a channel and is useable by the mobile telephone to cause the routing controller to establish a call to the callee using the channel; and provisions for transmitting the access code reply message including the access code to the mobile telephone.

In accordance with another aspect of the invention, there is provided a mobile telephone. The mobile telephone includes a processor circuit, a network interface in communication with the processor circuit, and a computer readable medium in communication with the processor circuit and encoded with codes for directing the processor circuit to: receive, from a user of the mobile telephone, a callee identifier associated with the callee; cause an access code request message to be transmitted to an access server, the access code request message including the callee identifier; receive an access code reply message from the access server in response to the access code request message, the access code reply message including an access code different from the callee identifier and associated with the callee identifier; and initiate a call using the access code to identify the callee.

The network interface may include a non-voice network interface, and the codes for directing the processor circuit to cause the access code request message to be transmitted may include codes for directing the processor circuit to cause the access code request message to be transmitted to the access server using the non-voice network interface on a non-voice network.

The access code request message may further include a location identifier of a location associated with the mobile telephone.

The location identifier may include an IP address of the mobile telephone in a wireless IP network.

The location identifier may include an identifier of a wireless voice signal station in wireless communication with the mobile telephone.

The location identifier may include a user-configured identifier of a location associated with the mobile telephone.

The network interface may include a non-voice network interface, and the codes for directing the processor circuit to receive an access code reply message may include codes for directing the processor circuit to cause the access code reply message to be received from the access server using the non-voice network interface on a non-voice network.

The access code may include a telephone number identifying a channel operably configured to cooperate with an IP network to cause a call involving the mobile telephone and the callee to be routed through the IP network.

The network interface may include a mobile telephone network interface, and the codes for directing the processor circuit to initiate may include codes for directing the processor circuit to cause a call to be initiated using the mobile telephone network interface on a mobile telephone network.

In accordance with another aspect of the invention, there is provided a system for initiating a call to a callee. The system includes: the mobile telephone; a routing controller; and an access server comprising a processor circuit and a computer readable medium in communication with the processor circuit. The computer readable medium is encoded with codes for directing the processor circuit to: receive from the mobile telephone the access code request message; communicate with the routing controller to obtain from the routing controller the access code wherein the access code identifies a channel and is useable by the mobile telephone to cause the routing controller to establish a call to the callee using the channel; and transmit the access code reply message to the mobile telephone.

In accordance with another aspect of the invention, there is provided a computer readable medium encoded with codes for directing a processor circuit to: receive, from a user of a mobile telephone, a callee identifier associated with a callee; transmit an access code request message to an access server, the access code request message including the callee identifier; receive an access code reply message from the access server in response to the access code request message, the access code reply message including an access code different from the callee identifier and associated with the callee identifier; and initiate a call using the access code to identify the callee.

In accordance with another aspect of the invention, there is provided a method for enabling a mobile telephone to initiate a call to a callee through a channel. The method involves: receiving from the mobile telephone an access code request message including a callee identifier associated with the callee; communicating with a routing controller to obtain from the routing controller an access code identifying the channel, the access code being different from the callee identifier and useable by the mobile telephone to initiate a call to the callee using the channel; and transmitting an access code reply message including the access code to the mobile telephone.

Receiving may involve receiving the access code request message on a non-voice network.

The method may further involve causing the routing controller to produce the access code.

Producing may involve selecting the access code from a pool of access codes, where each access code in the pool of access codes identifies a respective telephone number.

The method may further involve determining a local calling area associated with the mobile telephone.

Determining may involve accessing a dialing profile associated with the caller, the dialing profile including a location field having contents identifying at least a default location of the caller.

Determining may involve receiving an IP address of the mobile telephone in a wireless IP network.

Determining may involve receiving an identifier of a wireless voice signal station in wireless communication with the mobile telephone.

Determining may involve receiving a user-configured identifier of a location associated with the mobile telephone.

Selecting may involve selecting an access code in the local calling area associated with the mobile telephone.

Each access code in the pool of access codes may further identify a respective channel operably configured to cooperate with an IP network to cause a call involving the mobile telephone and the callee to be routed through the IP network.

The method may further involve causing the routing controller to establish communication through the IP network in response to a call received on the channel.

Producing may further involve storing a caller identifier associated with the mobile telephone in association with the access code.

Causing the routing controller to establish communication may involve causing the routing controller to establish communication only if the caller identifier associated with the access code identifies the mobile telephone.

Producing may further involve storing the callee identifier in association with the access code.

Producing may further involve searching the pool of access codes for an access code associated with the callee identifier to identify the channel usable by the mobile telephone to initiate a call to the callee.

Producing may further involve storing, in association with the access code, a timestamp for use in determining when the usability of the access code to initiate a call to the callee will expire.

Causing the routing controller to establish communication may involve causing the routing controller to establish communication only if the usability of the access code to initiate a call to the callee has not expired.

Transmitting may involve transmitting the access code reply message on a non-voice network.

In accordance with another aspect of the invention, there is provided a system for enabling a mobile telephone to initiate a call to a callee through a channel. The system includes: provisions for receiving from the mobile telephone an access code request message including a callee identifier associated with the callee; provisions for communicating with the routing controller to obtain from the routing controller an access code identifying the channel, the access code being different from the callee identifier and useable by the mobile telephone to initiate a call to the callee using the channel; and provisions for transmitting an access code reply message including the access code to the mobile telephone.

The provisions for receiving may include a non-voice network interface for receiving the access code request message on a non-voice network.

The system may further include provisions for producing the access code.

The provisions for producing may include a processor circuit operably configured to select the access code from a pool of access codes, where each access code in the pool of access codes identifies a respective telephone number.

The processor circuit may be operably configured to determine a local calling area associated with the mobile telephone.

The processor circuit may be operably configured to determine a local calling area associated with the mobile telephone using a dialing profile associated with the caller, the dialing profile including a location field having contents identifying at least a default location of the caller.

The processor circuit may be operably configured to determine a local calling area associated with the mobile telephone using an IP address of the mobile telephone in a wireless IP network.

The processor circuit may be operably configured to determine a local calling area associated with the mobile telephone using an identifier of a wireless voice signal station in wireless communication with the mobile telephone.

The processor circuit may be operably configured to determine a local calling area associated with the mobile telephone using a user-configured identifier of a location associated with the mobile telephone.

The processor circuit may be operably configured to select an access code in the local calling area associated with the mobile telephone.

Each access code in the pool of access codes may further identify a respective channel operably configured to cooperate with an IP network to cause a call involving the mobile telephone and the callee to be routed through the IP network.

The processor circuit may be operably configured to establish communication through the IP network in response to a call received on the channel.

The processor circuit may be operably configured to store a caller identifier associated with the mobile telephone in association with the access code.

The processor circuit may be operably configured to cause the routing controller to establish communication only if the caller identifier associated with the access code identifies the mobile telephone.

The processor circuit may be operably configured to store the callee identifier in association with the access code.

The processor circuit may be operably configured to search the pool of access codes for an access code associated with the callee identifier to identify the channel usable by the mobile telephone to initiate a call to the callee.

The processor circuit may be operably configured to store, in association with the access code, a timestamp for use in determining when the usability of the access code to initiate a call to the callee will expire.

The processor circuit may operably configured to establish communication only if the usability of the access code to initiate a call to the callee has not expired.

The provisions for transmitting may include a non-voice network interface for transmitting the access code reply message on a non-voice network.

In accordance with another aspect of the invention, there is provided a system for enabling a mobile telephone to initiate a call to a callee through a channel. The system includes a processor circuit, a network interface in communication with the processor circuit, and a computer readable medium in communication with the processor circuit and encoded with codes for directing the processor circuit to: receive from the mobile telephone an access code request message including a callee identifier associated with the callee; communicate with the routing controller to obtain from the routing controller an access code identifying the channel, the access code being different from the callee identifier and useable by the mobile telephone to initiate a call to the callee using the channel; and cause an access code reply message including the access code to be transmitted to the mobile telephone.

The network interface may include a non-voice network interface, and the codes for directing the processor circuit to receive may include codes for directing the processor circuit to cause the access code request message to be received using the non-voice network interface on a non-voice network.

The computer readable medium may be further encoded with codes for directing the processor circuit to cause the access code to be produced.

The codes for directing the processor circuit to cause the access code to be produced may cause the access code to be selected from a pool of access codes, where each access code in the pool of access codes identifies a respective telephone number.

The computer readable medium may be further encoded with codes for directing the processor circuit to cause to be determined a local calling area associated with the mobile telephone.

The codes for directing the processor circuit to cause to be determined may cause a dialing profile associated with the caller to be accessed, the dialing profile including a location field having contents identifying at least a default location of the caller.

The codes for directing the processor circuit to cause to be determined may cause to be received an IP address of the mobile telephone in a wireless IP network.

The codes for directing the processor circuit to cause to be determined may cause to be received an identifier of a wireless voice signal station in wireless communication with the mobile telephone.

The codes for directing the processor circuit to cause to be determined may cause to be received a user-configured identifier of a location associated with the mobile telephone.

The codes for directing the processor circuit to cause the access code to be produced may further cause to be selected an access code in the local calling area associated with the mobile telephone.

Each access code in the pool of access codes may further identify a respective channel operably configured to cooperate with an IP network to cause a call involving the mobile telephone and the callee to be routed through the IP network.

The computer readable medium may be further encoded with codes for directing the processor circuit to cause communication through the IP network to be established in response to a call received on the channel.

The codes for directing the processor circuit to cause the access code to be produced may cause a caller identifier associated with the mobile telephone to be stored in association with the access code.

The codes for directing the processor circuit to cause communication to be established may cause communication to be established only if the caller identifier associated with the access code identifies the mobile telephone.

The codes for directing the processor circuit to cause the access code to be produced may cause the callee identifier to be stored in association with the access code.

The codes for directing the processor circuit to cause the access code to be produced may cause the pool of access codes to be searched for an access code associated with the callee identifier to identify the channel usable by the mobile telephone to initiate a call to the callee.

The codes for directing the processor circuit to cause the access code to be produced may cause a timestamp for use in determining when the usability of the access code to initiate a call to the callee will expire, to be stored in association with the access code.

The codes for directing the processor circuit to cause communication to be established may cause communication to be established only if the usability of the access code to initiate a call to the callee has not expired.

The network interface may include a non-voice network interface, and the codes for directing the processor circuit to transmit include codes for directing the processor circuit to cause the access code reply message to be transmitted using the non-voice network interface on a non-voice network.

In accordance with another aspect of the invention, there is provided a computer readable medium encoded with codes for directing a processor circuit to: receive from the mobile telephone an access code request message including a callee identifier associated with the callee; communicate with the routing controller to obtain from the routing controller an access code identifying the channel, the access code being different from the callee identifier and useable by the mobile telephone to initiate a call to the callee using the channel; and cause an access code reply message including the access code to be transmitted to the mobile telephone.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 3 is a flow chart of a process executed by the mobile telephone shown in FIG. 1;

FIG. 4 is a schematic representation of an access code request message transmitted between the mobile telephone and an access server shown in FIG. 1;

FIG. 5 is a schematic representation of an access code reply message transmitted between the mobile telephone and the access server shown in FIG. 1;

FIG. 9 is a tabular representation of a dialing profile stored in a database accessible by the routing controller illustrated in FIG. 1;

FIG. 10 is a tabular representation of an access code association table stored in memory accessible by the routing controller shown in FIG. 1;

FIG. 19 is a tabular representation of a gateway node association table stored in the database illustrated in FIG. 1.

DETAILED DESCRIPTION

Figure 1:
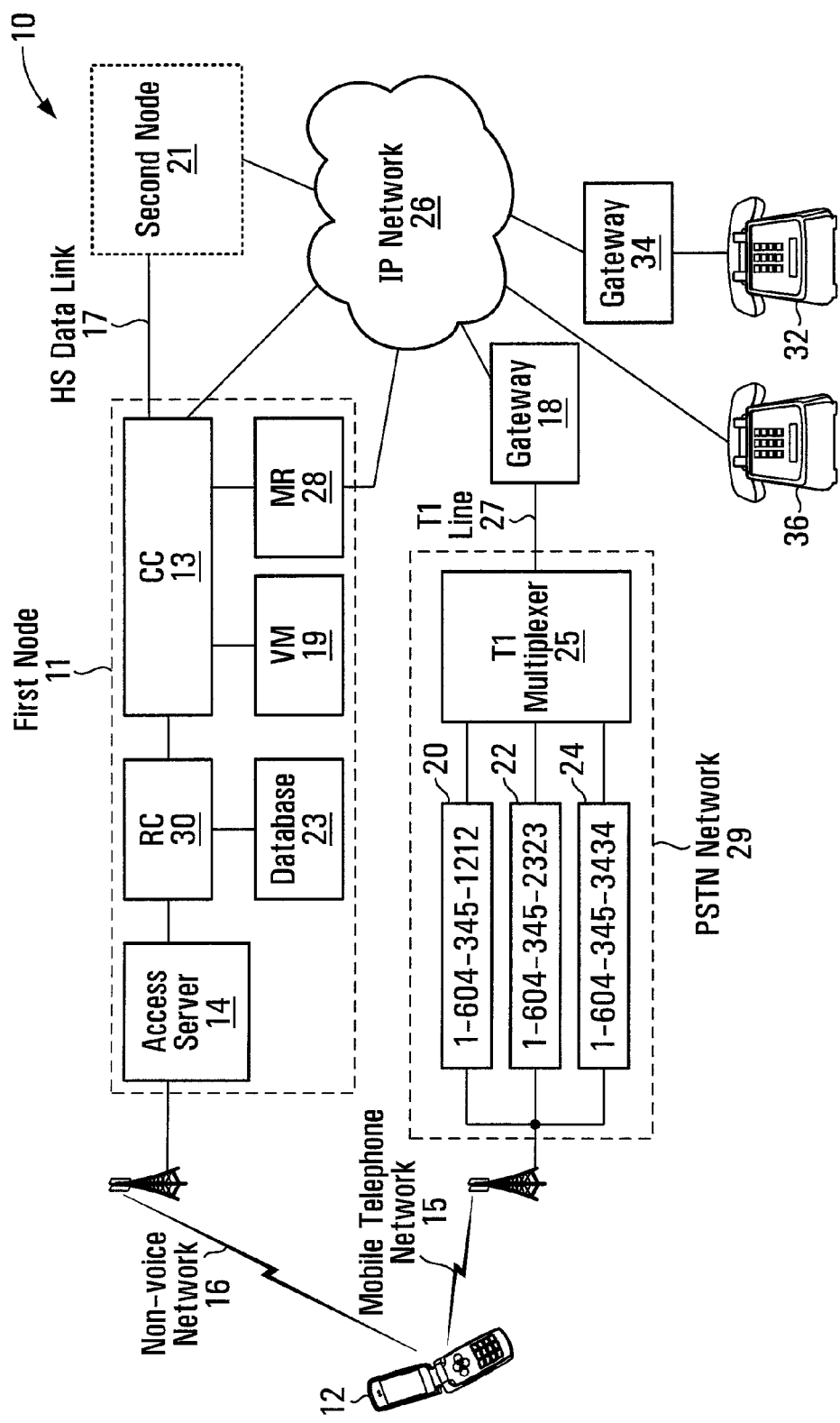
FIG. 1 is a block diagram of a system for enabling a mobile telephone to initiate a call through a channel to a callee in accordance with a first embodiment in the invention.

Referring to FIG. 1, a system for enabling a mobile telephone to initiate a call to a callee is shown generally at 10. The system 10 includes a first node 11, a second node 21, and a mobile telephone 12.

The first and second nodes 11 and 21 in the illustrated embodiment may support "voice-over-IP" (VoIP) calls between telephones and/or videophones using the Internet protocol (IP), as described in PCT Publication No. WO 2008/052340, which is hereby incorporated by reference in its entirety herein. In the embodiment shown, the first node 11 is located in a geographical area, such as Vancouver, British Columbia, Canada, for example, and the second node 21 is located in London, England, for example. Different nodes may be located in different geographical regions throughout the world to provide telephone/videophone service to subscribers in respective regions. These nodes may be in communication with each other by high speed/high data throughput links including optical fiber, satellite, and/or cable links illustrated generally at 17, forming a backbone to the system. These nodes may alternatively, or in addition, be in communication with each other through conventional internet services.

In the embodiment shown, the first node 11 provides telephone/videophone service to western Canadian customers from Vancouver Island to Ontario. Another node (not shown) may be located in Eastern Canada to provide services to subscribers in that area, for example.

Other nodes of the type shown may also be employed within the geographical area serviced by a node to provide for call load sharing, for example, within a region of the geographical area serviced by the node. However, in general, all nodes may be similar and have the properties described in connection with the first node 11.

In this embodiment, the first node 11 includes a call controller (CC) 13, an access server 14, a routing controller (RC) 30, a database 23, a voicemail server 19, and a media relay 28. Each of these may be implemented as separate modules on a common computer system or by separate computers, for example. The voicemail server 19 need not be included in the node and can be provided by a third party service provider. Although the access server 14 is illustrated as being part of the first node 11, access servers in alternative embodiments may be separate from the node and may be in communication with one or more nodes, for example.

The mobile telephone 12 is configured to place calls over a mobile telephone network, illustrated generally at 15, in a manner well-known in the art. Furthermore, the mobile telephone 12 and the access server 14 are configured to communicate with each other, preferably on a non-voice network illustrated generally at 16, such as a "WiFi" wireless IP network or a General Packet Radio Service (GPRS) network, for example. However, in alternative embodiments, the mobile telephone 12 and the access server 14 may communicate with each other over other networks, such as a mobile telephone network using Short Message Service (SMS) messages, for example.

The system 10 further includes a gateway 18 in communication with at least one, and preferably a plurality of, channels, which are illustrated schematically at 20, 22, and 24, to which the mobile telephone 12 may initiate a call over the mobile telephone network 15. The channels 20, 22, and 24 maybe telephone lines in a Public Switched Telephone Network (PSTN) 29. The channels 20, 22, and 24 maybe associated with PSTN telephone numbers in a local calling area associated with the mobile telephone 12, and thus these channels preferably depend on a geographical location of the mobile telephone. The expression "local calling area" herein refers generally to a set of telephone numbers, typically defined by a geographical region, to which telephone calls may be placed by callers within the local calling area at either no additional charge or at a lower additional charge than would be required for calls to numbers that are outside of the local calling area. However, it will be appreciated that in other embodiments, the gateway 18 may be in communication with any number of channels, which need not be PSTN telephone lines. Also, in the illustrated embodiment, the channels 20, 22, and 24 are associated with telephone numbers for Vancouver, British Columbia, Canada and the surrounding area, although it will be appreciated that these channels may include PSTN telephone lines associated with other areas, for example, which may not necessarily be in a local calling area associated with the mobile telephone 12.

In the illustrated embodiment, each of the channels 20, 22, and 24 is configured by a PSTN service provider (which, in Canada, may be Bell Canada or Telus, for example) to direct calls that are received on the channels to the gateway 18. In the illustrated embodiment, the PSTN service provider has configured the channels 20, 22, and 24 to communicate with a T1 multiplexer 25, which multiplexes the channels 20, 22, and 24 in a manner known in the art onto one or more T1 lines 27 that are in communication with the gateway 18. The gateway 18 is in communication with an IP network shown generally at 26. The channels 20, 22, and 24 are thus configured to cooperate with the IP network 26 (via the gateway 18 in the illustrated embodiment) to cause a call involving the mobile telephone 12 and the callee to be routed through the IP network in response to a call received at one of the channels.

Also, in the illustrated embodiment, the access server 14 is in communication with the routing controller 30 of the first node 11, and the routing controller 30 is configurable to associate a callee identifier with one of the channels 20, 22, and 24, as described below. A callee identifier associated with one of the channels 20, 22, and 24 may be a telephone number of a PSTN telephone 32 that is in communication with the IP network 26 through a gateway 34, or it may be a telephone number of a VoIP telephone 36 that is directly in communication with the IP network 26, for example. Other routing controllers 30 of other nodes, such as the second node 21, for example, may also associate callee identifiers with other channels that are in communication with other gateways (not shown).

Mobile Telephone

Figure 2:
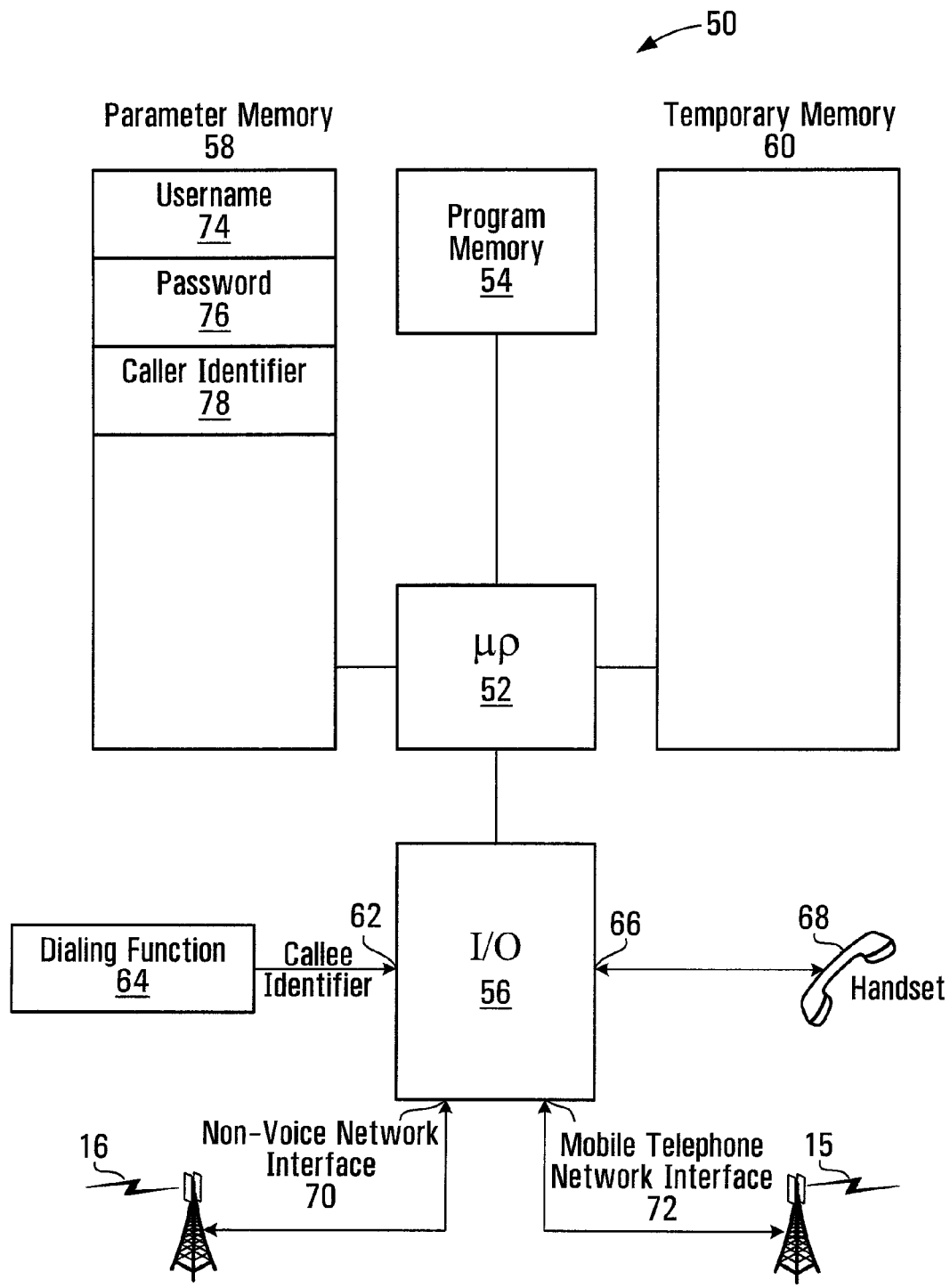
FIG. 2 is a block diagram of mobile telephone shown in FIG. 1.

Referring to FIG. 2, in this embodiment, the mobile telephone (12) includes a processor circuit shown generally at 50. The processor circuit 50 includes a microprocessor 52, a program memory 54, an input/output (I/O) port 56, parameter memory 58, and temporary memory 60. The program memory 54, I/O port 56, parameter memory 58, and temporary memory 60 are all in communication with the microprocessor 52. The processor circuit 50 may alternatively include a plurality of processors, a plurality of program memories, a plurality of temporary memories, and/or a plurality of I/O ports, or these components may alternatively be combined into a single device. However, for simplicity, the components of the processor circuit 50 are illustrated as shown in the example of FIG. 2.

In the illustrated embodiment, the I/O port 56 includes a dialing input 62 for receiving a callee identifier from a key pad, for example, or from a voice recognition unit, or from pre-stored callee identifiers stored in the parameter memory 58, for example. For illustration purposes only, a myriad of possible dialing functions for providing a callee identifier are represented by the block entitled dialing function 64. A callee identifier may be a telephone number of a callee, for example.

The I/O port 56 also includes a handset interface 66 for receiving and producing signals to and from a handset 68 that may be placed close to the user's ear and mouth, for producing and receiving audible signals for and from the user. It will be appreciated that alternatively, the handset 68 may include a camera and video screen, for example, and that video or other types of signals may be transmitted additionally or alternatively to audible signals.

The I/O port 56 also includes a non-voice network interface 70 for transmitting information to, and receiving information from, the non-voice network 16 illustrated in FIG. 1, for example, and preferably interfaces with a high-speed internet connection.

The I/O port 56 in the illustrated embodiment further includes a mobile telephone network interface 72 for transmitting signals to and receiving signals from a mobile telephone service provider over a network such as a Global System for Mobile communications (GSM) or a Code Division Multiple Access (CDMA) network, such as the mobile telephone network 15 illustrated in FIG. 1, for example. Again, for simplicity, a mobile telephone network interface is illustrated, although it will be appreciated that video signals or other signals may be handled similarly when the mobile telephone (12) is facilitating communication of one or more of these types of signals. It will also be appreciated that alternatively, the non-voice network interface 70 and mobile telephone network interface 72 need not be distinct, but may be a single interface for communication over a single network, for example, or may be configured to communicate over a plurality of different networks, for example.

In the illustrated embodiment, the parameter memory 58 includes a username field 74 and a password field 76, although it will be appreciated that the username and password may not be necessary, or may be input by the user as required, for example. The parameter memory 58 in the illustrated embodiment also includes a caller identifier field 78 for storing a caller identifier, which may be a telephone number associated with the mobile telephone (12) for identifying a "channel" such as a telephone line assigned to the mobile telephone that may be used to call back to the mobile telephone, for example. Generally, the contents of the username field 74, the password field 76, and the caller identifier field 78 are set once when the user first subscribes to the system.

The usernames referred to herein, such as the username in the username field 74, preferably include a twelve digit number such as 2001 1050 8667, for example, wherein the leftmost digit is a continent code (such as "2" to indicate North America, for example), followed by a three-digit country code (such as "001" to indicate Canada and the United States, for example), a four-digit dealer code (such as "1050", for example), and a unique four-digit number code (such as "8667", for example), as discussed more generally in PCT Publication No. 2008/052340. Therefore, a prefix of a username referred to herein preferably indicates a geographical region associated with the user, or with the access code, and more preferably indicates a node associated with the user or access code.

The program memory 54 stores blocks of codes for directing the microprocessor 52 to carry out the functions of the mobile telephone (12), which are illustrated by example below.

Referring to FIGS. 2 and 3, a flow chart representing functions performed by blocks of code that direct the microprocessor 52 to initiate a call with the mobile telephone 12 to a callee is shown generally at 100. The blocks shown in FIG. 3 generally represent codes that may be stored in the program memory 54 for example, for directing the microprocessor 52 to perform various functions relating to initiating a call with the mobile telephone (12) to a callee. The actual code to implement each block may be written in any suitable programming language, such as Java, C, and/or C++, for example.

The process 100 begins at 102, in response to an interrupt produced at or for the microprocessor 52 by the dialing function 64. Upon initiation of the process 100, block 104 directs the microprocessor 52 to obtain a callee identifier from the dialing function 64 at the dialing input 62 of the I/O port 56 in the illustrated embodiment. The callee identifier is associated with a desired callee, and may be a telephone number of the callee, for example. The microprocessor 52 thus receives, from a user of the mobile telephone (12), a callee identifier associated with a callee.

Block 106 directs the microprocessor 52 to transmit, using the non-voice network interface 70 in the illustrated embodiment, an access code request message, the access code request message including the callee identifier obtained at block 104, to the access server 14 (illustrated in FIG. 1). In general, preferably block 106 directs the microprocessor 52 to cause an access code request message to be transmitted to the access server 14 over a non-voice network, such as an internet, using WiFi or GPRS technology for example. However, it will be appreciated that block 106 may direct the microprocessor 52 to transmit an access code request message to the access server 14 using any suitable technique, which may alternatively include a voice network, for example.

Referring to FIG. 4, an exemplary access code request message is shown generally at 110. The access code request message 110 includes a username field 112, a password field 114, a callee identifier field 116, and a caller identifier field 118. In the illustrated embodiment, values for the username, password, and caller identifier fields 112, 114, and 118 are retrieved from the username, password, and caller identifier fields 74, 76, and 78 respectively in the parameter memory 58 of the processor circuit 50 (illustrated in FIG. 2), and a value for the callee identifier field 116 is obtained from the dialing function 64 in block 104, and may be stored in the temporary memory (60), for example. It will be appreciated that the username field 112, password field 114, and caller identifier field 118 are not essential, although these fields are preferable in order to identify the user of the mobile telephone for billing purposes, for example.

Referring to FIGS. 1 and 4, it will be appreciated that in order to minimize charges from the mobile telephone service provider of the mobile telephone 12, the channels 20, 22, 24 will preferably be local or relatively inexpensive telephone lines associated with a geographical location, more particularly a pre-defined local calling area, associated with the mobile telephone 12. Therefore, the exemplary access code request message 110 further includes a location identifier field 119. The location identifier stored in the location identifier field 119 preferably identifies a location of the mobile telephone 12 for use in determining a local calling area associated with the mobile telephone 12.

For example, the location identifier in the location identifier field 119 may include an IP address of the mobile telephone 12 in a wireless IP network, such as the non-voice network 16 to which the non-voice network interface 70 shown in FIG. 2 is connected, because this IP address may be an indicator of a geographical location of the mobile telephone 12. The location identifier may also or alternatively include an identifier of a wireless voice signal station in wireless communication with the mobile telephone. In the illustrated embodiment, the wireless voice signal station is part of the mobile telephone network 15 that is in communication with the mobile telephone 12 through the mobile telephone network interface 72 illustrated in FIG. 2. In still other embodiments, the location identifier may include a user-configured identifier of a geographical location or local calling area where the mobile telephone 12 is or may be situated. The location identifier may thus be pre-determined and stored in the parameter memory 58 shown in FIG. 2 or may be acquired from non-voice network or wireless voice signal station or from user input, for example. Therefore, in summary, the location identifier in the location identifier field 119 may include one or more of an IP address of the mobile telephone 12 in a wireless IP network, an identifier of a wireless voice signal station in wireless communication with the mobile telephone, and a user-configured identifier.

As described below, the location identifier in the location identifier field 119 may be used to determine a local calling area associated with the mobile telephone 12, within which local calling area channels (illustrated as 20, 22, and 24 in FIG. 1) are available to the mobile telephone 12 for the lowest cost to the user. However, it will be appreciated that the location identifier may only approximately identify a local calling area, and may not necessarily identify the lowest cost channel (illustrated as 20, 22, and 24 in FIG. 1) for the mobile telephone 12. It will also be appreciated that in other embodiments, the location identifier field 119 may be omitted.

Referring back to FIG. 3, the process 100 continues at block 130, which directs the microprocessor (52) to receive an access code reply message from the access server (14) in response to the access code request message that was transmitted at block 106.

Referring to FIG. 5, an exemplary access code reply message is shown generally at 140. The access code reply message 140 includes an access code field 142 and a timeout field 144. In the illustrated embodiment, the access code field 142 stores an access code which is a telephone number associated with a telephone line associated with one of the channels 20, 22, or 24 in FIG. 1. It will be appreciated that the access code is different from the callee identifier in the callee identifier field 116 shown in FIG. 4, in that the access code identifies a channel, other than that provided by the callee identifier provided by the dialing function 64 in FIG. 2, that the mobile telephone (12) can use to initiate a call to the callee. It will be appreciated that use of the access code facilitates avoidance of long distance or roaming charges that a mobile telephone service provider would charge for a call placed directly using the callee identifier using conventional calling processes, for example.

Still referring to FIG. 5, the timeout field 144 in the illustrated embodiment stores a value that indicates a period of time, for example a number of minutes, during which the access code in the access code field 142 is associated with the callee identifier in the callee identifier field 116 of the exemplary access code request message 110 illustrated in FIG. 4, such that the access code is only temporarily associated with the callee identifier. In one embodiment, the value stored in the timeout field 144 indicates 10 minutes, for example. It will be appreciated that in other embodiments, the timeout field 144 may not be necessary, but preferably it is included.

In the illustrated embodiment, the program codes in block 130 direct the microprocessor 52 to receive the access code reply message over a non-voice network, such as a WiFi or GPRS network (illustrated at 16 in FIG. 1) via the non-voice network interface 70 shown in FIG. 2. However, it will be appreciated that the access code reply message may be received on any suitable network, even a voice network, for example.

Referring back to FIGS. 2 and 3, block 149 directs the microprocessor 52 to initiate a call with the mobile telephone (12) on the mobile telephone network 15 (illustrated in FIG. 1) using the access code received in the access code field 142 of the access code reply message 140 (shown in FIG. 5) to identify the callee. In the illustrated embodiment, the codes in block 149 direct the microprocessor 52 to initiate a call to the channel (20, 22, or 24) identified by the access code, using the mobile telephone network interface 72 of the I/O port 56 of the mobile telephone (12), to engage the mobile telephone network (15).

Referring to FIG. 1, in the embodiment shown, the access code in the access code field (142) is a telephone number identifying a channel 20, 22, or 24 that is in communication with the gateway 18 to the IP network 26. Through the gateway 18, the channel 20, 22, or 24 is thus operably configured to cooperate with the IP network 26 to cause a call from the mobile telephone 12 to the callee to be routed through the IP network. Routing the call through the IP network may involve engaging the routing controller 30 to route the call on the IP network 26 to the callee, as described below. However, it will be appreciated that in other embodiments, the access code need not be a telephone number, but may be any code identifying a channel through which the mobile telephone 12 can initiate a call. Alternatively, if the mobile telephone is capable of voice over IP communications, the access code may be used to identify an IP address in the IP network to which the call is routed. In this embodiment, the IP address may act as the access code. The process 100 shown in FIG. 3 is then ended.

Access Server

Figure 6:
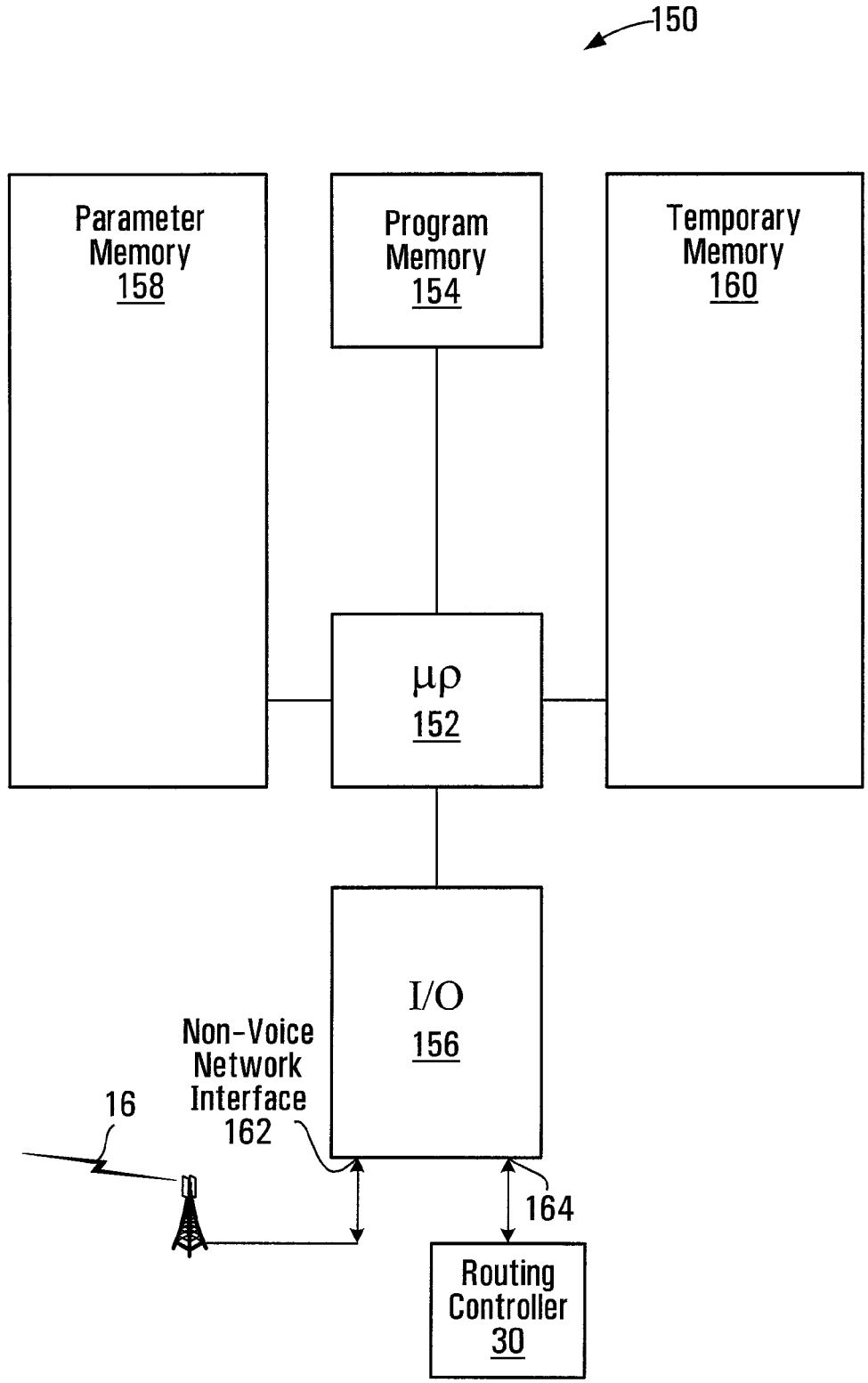
FIG. 6 is a block diagram of the access server shown in FIG. 1.

Referring to FIG. 6, the access server (14) includes a processor circuit shown generally at 150. The processor circuit 150 includes a microprocessor 152, program memory 154, an I/O port 156, parameter memory 158, and temporary memory 160. The program memory 154, I/O port 156, parameter memory 158, and temporary memory 160 are all in communication with the microprocessor 152. The processor circuit 150 may alternatively include a plurality of microprocessors or I/O ports, for example, and the components of the illustrated processor circuit 150 may also alternatively be combined into a single device.

The program memory 154 stores blocks of codes for directing the microprocessor 152 to carry out the functions of the access server 14. The I/O port 156 includes a non-voice network interface 162 for communicating with the non-voice network 16 illustrated in FIG. 1. The I/O port 156 also includes a routing controller interface 164 for interfacing with the routing controller 30 illustrated in FIG. 1.

Figure 7:
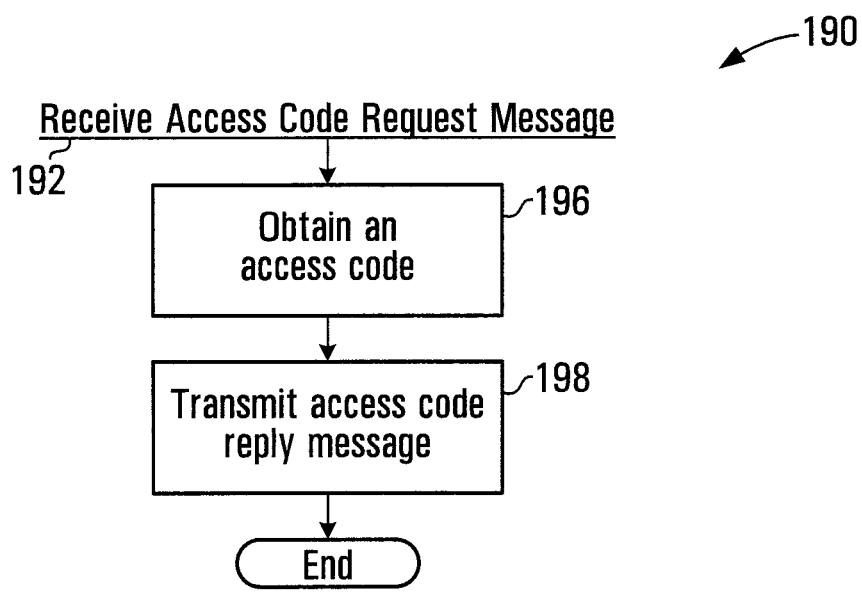
FIG. 7 is a flow chart of a process executed by the access server shown in FIG. 1.

Referring to FIGS. 6 and 7, a flow chart of blocks of code for directing the microprocessor 152 of the access server (14) to provide an access code to the mobile telephone (12) is shown generally at 190. The blocks 190 in FIG. 7 generally represent codes that may be stored in the program memory 154 for directing the microprocessor 152 to perform various functions to provide the access to the mobile telephone (12) to enable the mobile telephone to place a call through a channel (20, 22, or 24).

The process 190 begins at 192, in response to an interrupt created by or for the microprocessor 152 when it receives an access code request message 110 (as illustrated in FIG. 4) from the mobile telephone (12). In the illustrated embodiment, the access code request message (110) is received via the non-voice network interface 162 through a non-voice network (16) such as a WiFi or GPRS network, for example. However, it will be appreciated that other embodiments may use different techniques for receiving the access code request message (110) from the mobile telephone (12).

The process 190 continues at block 196, which directs the microprocessor 152 to communicate with the routing controller 30 to obtain from the routing controller an access code identifying a channel (illustrated as 20, 22, or 24 in FIG. 1) in communication with the gateway (18), wherein the access code is different from the callee identifier in the callee identifier field 116 (shown in FIG. 4) and is usable by the mobile telephone (12) to initiate a call to the callee using the channel, as further described below. Therefore, block 196 preferably causes an access code to be produced by retransmitting the access code request message 110 illustrated in FIG. 4 that was received at 192 from the mobile telephone (12), to the routing controller 30 through the routing controller interface 164 of the I/O port 156.

The process 190 continues at block 198, which directs the microprocessor 152 to transmit an access code reply message (140), including the access code obtained by block 196, to the mobile telephone (12). An exemplary access code reply message is shown in FIG. 5. In the illustrated embodiment, an access code reply message (140) is produced by the routing controller 30 in a manner described below in response to the access code request message (110) that was transmitted to the routing controller at block 196, and the access code reply message (140) is received from the routing controller through the routing controller interface 164 of the I/O port 156. Block 198 then causes the access code reply message that was received from the routing controller to be retransmitted to the mobile telephone (12). In the illustrated embodiment, the codes in block 198 direct the microprocessor 152 to transmit the access code reply message (140) using the non-voice network interface 162 to the non-voice network 16, which may be a WiFi or GPRS network, for example. However, it will be appreciated that other embodiments may employ other types of networks for communicating the access code reply message (140) to the mobile telephone (12). The process 190 is then ended.

In summary, referring to FIG. 1, the access server 14 generally acts as an interface to the routing controller 30 for relaying access code request messages and access code reply messages between the mobile telephone 12 and the routing controller. Therefore, it will be appreciated that in alternative embodiments, the access server 14 and the routing controller 30 need not be separate, but may, for example, be combined in a single component.

Routing Controller (RC)

Referring to FIG. 1, generally, the routing controller 30 executes a process to facilitate communication between callers and callees. The function of a routing controller generally in a VoIP system is described in PCT Publication No. WO 2008/052340.

Figure 8:
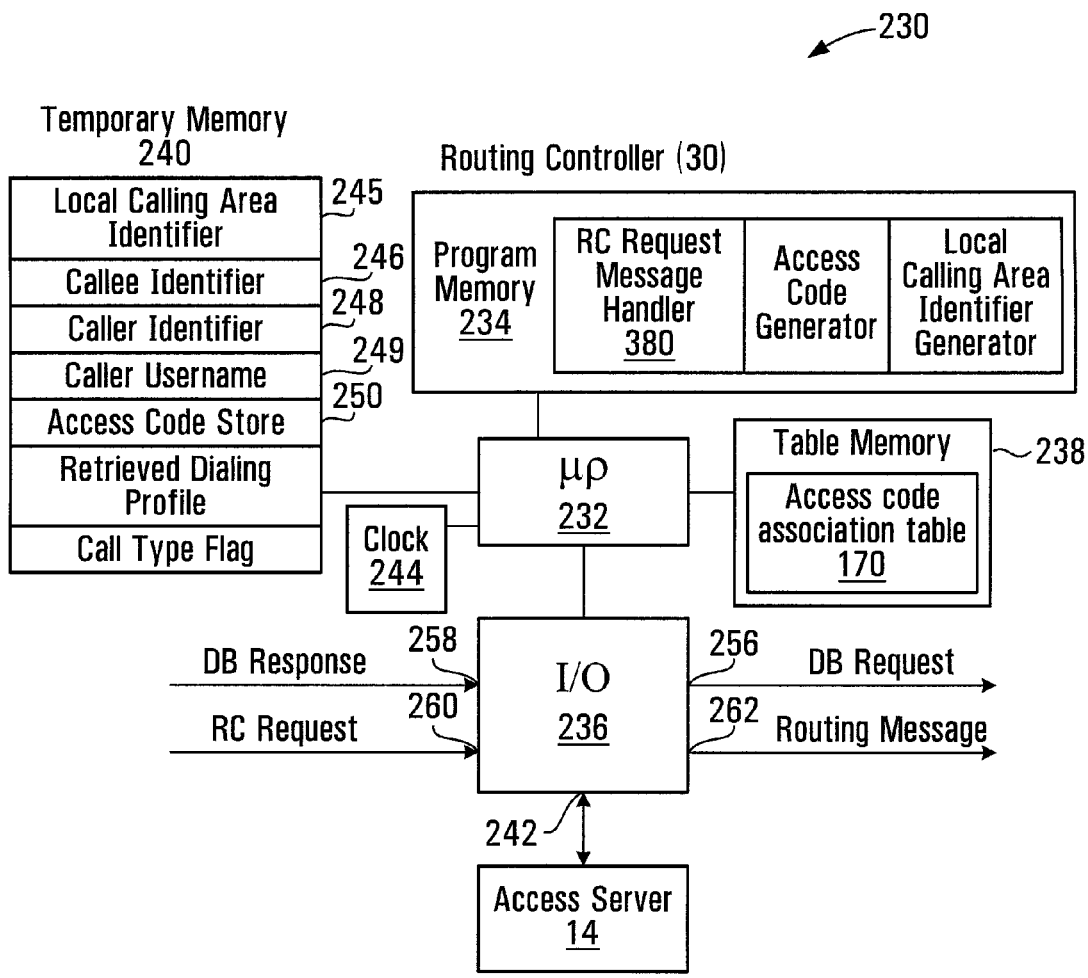
FIG. 8 is a block diagram of a routing controller shown in FIG. 1.

Referring to FIG. 8, the routing controller (30) includes a processor circuit shown generally at 230. The processor circuit 230 includes a microprocessor (or more generally a processor) 232, program memory 234, an I/O port 236, table memory 238, temporary memory 240, and a clock 244. The program memory 234, I/O port 236, table memory 238, temporary memory 240, and clock 244 are all in communication with the processor 232. The processor circuit 230 may include a plurality of microprocessors, for example, and the aforementioned components of the processor circuit 230 may be combined, for example. The program memory 234 includes blocks of code for directing the processor 232 to carry out the functions of the routing controller (30), and the I/O port 236 includes an access server interface 242 for communicating with the access server 14.

In the illustrated embodiment as described above, the access server (14) transmits (at block 196 illustrated in FIG. 7) an access code request message (110) to the routing controller (30) in order to obtain from the routing controller (30) an access code. When an access code request message (110) is received at the access server interface 242, the processor 232 preferably stores certain values from the access code request message in stores in the temporary memory 240 for ease of retrieval. In particular, the temporary memory 240 includes a callee identifier store 246 for storing the callee identifier from the callee identifier field 116 in the access code request message 110 illustrated in FIG. 4, a caller identifier store 248 for storing the caller identifier that was stored in the caller identifier field 118 of the access code request message 110 illustrated in FIG. 4, a caller username store 249 for storing the caller username that was stored in the caller username field 112 of the access code request message 110 illustrated in FIG. 4, and an access code store 250 for storing an access code that is selected when the routing controller (30) receives an access code request message (110). The temporary memory 240 also includes a local calling area identifier store 245 for storing an identifier of a local calling area associated with the mobile telephone (12). The clock 244 generally maintains and stores a representation of a current date and time.

The I/O port 236 further includes a database request port 256 through which a request to the database (23 in FIG. 1) can be made, and also includes a database response port 258 for receiving a reply from the database (23). The I/O port 236 further includes a routing controller (RC) request message input 260 for receiving an RC request message (illustrated in FIG. 17) from the call controller (13 in FIG. 1) and includes a routing message output 262 for sending a routing message back to the call controller 13. The I/O port 236 thus acts to receive a caller identifier and a callee identifier contained in an RC request message from the call controller, the RC request message being received in response to initiation of a call by a subscriber of the system, as described below.

Figures 16, 17:
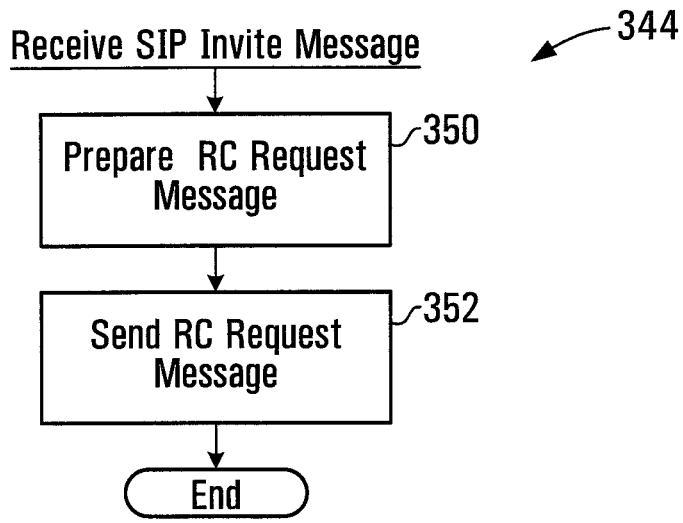
FIG. 16 is a flow chart of a process executed by the call controller illustrated in FIG. 1.
FIG. 17 is a tabular representation of an RC request message transmitted between the call controller and the routing controller illustrated in FIG. 1

The program memory 234 includes blocks of codes for directing the processor 232 to carry out various functions of the routing controller (30). One of these blocks includes an RC request message handler 380 which directs the routing controller (30) to produce a routing message in response to a received RC request message, an example of which is illustrated in FIG. 17. The RC request message handler process is shown in greater detail at 380 in FIGS. 18A through 18C. Another of these blocks in the program memory 234 includes an access code generator, which is described at 270 in FIG. 12, and which directs the routing controller (30) to produce an access code as directed by the program codes in block 196 shown in FIG. 7. Yet another of these blocks in the program memory 234 includes a local calling area identifier generator, which directs the routing controller (30) to produce a local calling area identifier using the location identifier from the location identifier field 119 of the access code request message 110 illustrated in FIG. 4.

Local Calling Area Identifier Generator

Referring to FIG. 1, it will be appreciated that preferably, a call made by the mobile telephone 12 using the access code obtained from the access server 14 will be a local call for the mobile telephone 12, based on a geographical location of the mobile telephone. Therefore, blocks in the program memory 234 include a local calling area identifier generator, which directs the routing controller 30 to produce a local calling area identifier.

For example, the local calling area identifier generator may direct the microprocessor 152 to access a dialing profile associated with the caller. The dialing profile may be identified using the username in the username field 112 in the access code request message 110 illustrated in FIG. 4, and to store in the local calling area identifier field 245 a default location of the caller retrieved from the dialing profile associated with the caller.

Referring to FIG. 9, an exemplary dialing profile is illustrated generally at 200 and includes a username field 202, a domain field 204, and calling attributes comprising a national dialing digits (NDD) field 206, an international dialing digits (IDD) field 208, a country code field 210, a local area codes field 212, a caller minimum local number length field 214, a caller maximum local number length field 216, a reseller field 218, a maximum number of concurrent calls field 220, a current number of concurrent calls field 222, and a default local calling area identifier field 224. Therefore, in some embodiments, the local calling area identifier generator directs the microprocessor 152 to determine a local calling area associated with the mobile telephone (12) by retrieving the default local calling area identifier from the default local calling area identifier field 224 of the dialing profile 200.

Effectively, the dialing profile 200 is a record identifying calling attributes of the caller identified by the username in the username field 202. More generally, dialing profiles 200 represent calling attributes of respective users, and are discussed in more detail in PCT publication No. WO 2008/052340. As described in PCT publication No. WO 2008/052340, a dialing profile of the type shown in FIG. 9, and also other records such as direct-in-dial (DID) records, call blocking records, call forwarding records, and voicemail records, may be created whenever a user registers with the system or agrees to become a subscriber to the system.

Alternatively, the local calling area identifier generator may generate a local calling area identifier to be stored in the local calling area identifier store 245 using the location identifier from the location identifier field 119 of the access code request message 110 illustrated in FIG. 4. As described above, the location identifier field (119) may store one or more of an IP address of the mobile telephone (12) in a wireless IP network, an identifier of a wireless voice signal station in wireless communication with the mobile telephone, and a user-configured identifier. One or more of these values may be used to identify a local calling area that is or is likely to be associated with the mobile telephone (12) in order to generate a local calling area identifier to be stored in the local calling area identifier store 245.

For example, it has been found that services available from web sites such as http://www.ip2location.com/ and http://www.serviceobjects.com/products/dots_ipgeo.asp, for example, can produce a name of a location, and also latitude and longitude values, associated with an IP address. Using this information derived from an IP address, or other information from the location identifier field (119), a local calling area may be identified by hierarchical jurisdictional designations (such as country, province, and city in Canada or country, state, and city in the United States) and encoded as codes identifying the local calling area. These codes may then be stored in the local calling area identifier store 245.

Access Code Association Table

In the illustrated embodiment, the table memory 238 (shown in FIG. 8) includes an access code association table 170, an example of which is illustrated in FIG. 10, for associating access codes with callee identifiers, caller identifiers, caller usernames, timeouts, and timestamps. Although the routing controller (30) is illustrated in this embodiment as a separate component from the access server (14), it will be appreciated that in other embodiments, the routing controller (30) may be part of or integrated with the access server (14), and in these other embodiments, the access code association table 170 may be part of or integrated with the access server.

Referring to FIGS. 1 and 10, the access code association table 170 generally includes a plurality of records, each having an access code field 173 storing an access code. The access codes in the access code association table 170 may thus form a pool of access codes, where each access code may identify a respective telephone number. In the illustrated embodiment, the access codes in the access code fields 173 of records of the access code association table 170 identify respective channels (illustrated by example only as 20, 22, and 24) that are operably configured to cooperate with the IP network 26 via the gateway 18 to cause a call involving the mobile telephone 12 to be routed through the IP network.

Referring to FIG. 10, the exemplary access code association table 170 includes records 172, 174, 176, 178, and 180, each having respective fields for storing a local calling area identifier 171, an access code 173, a channel identifier 175, a callee identifier 177, a caller identifier 179, a caller username 183, a timeout 181, and a timestamp 182. Generally, a record in the access code association table 170 will be created for each access code that identifies a channel (such as the channels 20, 22, and 24 illustrated in FIG. 1) that is configured or configurable to establish communication through a gateway (such as the gateway 18 illustrated in FIG. 1) to an IP network (26 in FIG. 1) in response to a call received at the channel. When a record is created in respect of a channel, the local calling area identifier field 171 is preferably initialized with an identifier of a local calling area associated with the channel, the access code field 173 is preferably initialized with an access code associated with the channel, and the channel identifier field 175 is preferably initialized with an identifier of the channel. The remaining fields (for storing a callee identifier 177, a caller identifier 179, a caller username 183, a timeout 181, and a timestamp 182) are preferably initialized with default "null" values when a record is created. The fields for storing a local calling area identifier 171, an access code 173, a channel identifier 175 preferably remain generally constant during ordinary operation of the access code association table 170, although the values stored in the fields for storing a callee identifier 177, a caller identifier 179, a caller username 183, a timeout 181, and a timestamp 182 may vary as described below. It will be appreciated that in some embodiments, one or more of the fields for storing a local calling area identifier 171, a channel identifier 175, a caller identifier 179, a caller username 183, a timeout 181, and a timestamp 182 may not be required and be omitted.

As noted above, the local calling area identifier field 171 is preferably initialized with an identifier of a local calling area associated with the channel. The local calling area identifier field 171 preferably stores codes that are encoded in the same manner as the codes in the local calling area identifier store 245, as described above, so that an access code in the local calling area identified by the codes in the local calling area identifier store 245 may be identified by searching the access code association table 170 for an access code associated with a local calling area identifier in the associated local calling area identifier field 171 that matches the local calling area identifier in the local calling area identifier store 245. It has been found that information available from web sites such as http://en.wikipedia.org/wiki/List_of_NANP_area_codes, and services available from web sites such as http://www.serviceobjects.com/demos/PhoneExchangeDemo.asp, for example, may be used to determine a local calling area identifier associated with a given access code where, for example, the access code is a PSTN telephone number.

In the exemplary access code association table 170, the access codes in the access code fields 173 are telephone numbers for PSTN lines, three of which are in the 604 area code in Vancouver, British Columbia, Canada, and two of which are in the 416 area code in Toronto, Ontario, Canada. It will be appreciated that the access code association table 170 is an example only, and other access code association tables may include any number of access codes, which need not be PSTN telephone numbers, and which need not be limited to particular geographical areas.

In the exemplary access code association table 170, the access code field 173 in the record 174 stores an access code 1-604-345-2323, which may be a local telephone number for Vancouver, British Columbia, Canada, and the callee identifier field 177 of the record 174 stores a callee identifier 1-403-789-1234, which may be a telephone number for a callee in Calgary, Alberta, Canada for example, thereby associating the callee identifier 1-403-789-1234 with the access code 1-604-345-2323. Furthermore, the caller identifier field 179 of the record 174 stores a caller identifier 1-416-444-1441 and the caller username field 183 stores a caller username 2001 1050 8667, thereby associating the caller identifier 1-416-444-1441 and caller username 2001 1050 8667 with the aforementioned access code and callee identifier. The caller identifier 1-416-444-1441 may be associated with a mobile telephone normally geographically located in Toronto, Ontario, Canada, but which may be in Vancouver and is therefore using a Vancouver-based access code to place a call to a Calgary-based number, for example. In the example record 174, the timestamp field 182 indicates that the callee identifier 1-403-789-1234, the caller identifier 1-416-444-1441, and the caller username 2001 1050 8667 were associated with the access code 1-604-345-2323 on Jun. 15, 2008 at 10:31 am, and the timeout field 181 indicates that this association is to expire 10 minutes after the time indicated in the timestamp field.

Likewise, the exemplary record 178 indicates that the callee identifier 1-604-321-1234, the caller identifier 1-416-444-1234, and the caller username 2001 1050 4141 were associated with the access code 1-416-234-4646 on Jun. 15, 2008 at 2:21 pm, and the timeout field 181 of the record 178 indicates that this association is to expire within 10 minutes of the time in the timestamp field 182.

It will also be appreciated that the access code association table 170 may, in other embodiments, be substituted with other data structures or storage media. For example, in alternative embodiments, as described below, a DID record of the type shown at 370 in FIG. 11 may associate an access code with a callee identifier and with other information such as a caller identifier, a timeout value, and a timestamp value, additionally or alternatively to the access code association table 170.

DID Bank Table Records

As described in PCT Publication No. 2008/052340, a DID bank table record may be created and stored in a DID bank table in the database (23 in FIG. 1) when a user registers with the system, to associate the username of the user and a host name of the node with which the user is associated, with a number on the PSTN network formatted in compliance with the E.164 standard set by the International Telecommunication Union (ITU). However, as explained below, DID records may, in some embodiments, also associate usernames and host names with respective access codes, and may also associate access codes with respective callee identifiers and with other information such as caller identifiers, timeout values, and timestamp values.

Figure 11:
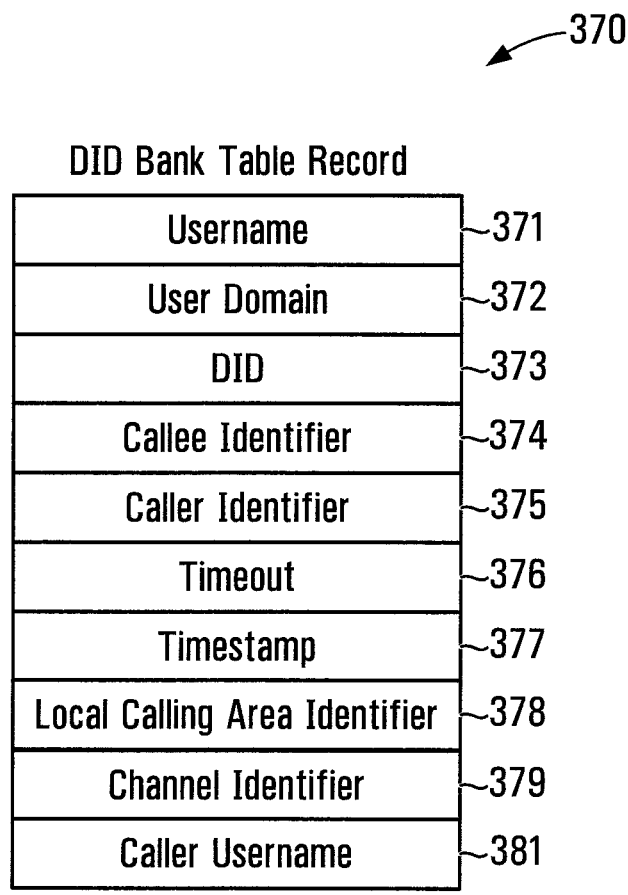
FIG. 11 is a schematic representation of a DID bank table record stored in a database shown in FIG. 1.

Referring to FIG. 11, an exemplary DID bank table record is shown generally at 370, and includes a username field 371, a user domain field 372, and a DID field 373. The username field 371 may store a username of a user of the system, in which case the user domain field 372 stores a host name of the node with which the user is associated, and the DID field 373 stores an E.164 number on the PSTN network associated with the user. Exemplary host names stored in the user domain field 372 include sp.yvr.digifonica.com for Vancouver, British Columbia, Canada and sp.lhr.digifonica.com for London England, for example, as described in PCT Publication No. 2008/052340. If the user has multiple telephone numbers, then multiple records of the type shown at 370 would be included in the DID bank table, each having the same username and user domain, but different DID field 373 contents reflecting the different telephone numbers associated with that user.

However, DID fields 373 of DID bank table records 370 may also store access codes, in which case the username field 371 may store a username associated with the access code. In these DID bank table records 370, the user domain field 372 stores a host name of the node with which the access code is associated. Therefore, DID bank table records 370 may, in some embodiments, associate usernames and host names with respective access codes.

The exemplary DID bank table record 370 further includes a callee identifier field 374, a caller identifier field 375, a timeout field 376, a timestamp field 377, a local calling area identifier field 378, a channel identifier field 379, and a caller username field 381, which may be used in an analogous manner to the callee identifier field 177, the caller identifier field 179, the timeout field 181, the timestamp field 182, the local calling area identifier field 171, the channel identifier field 175, and the caller username field 183 respectively of the access code association table 170 illustrated in FIG. 10. The DID bank table records 370 may thus associate access codes with respective local calling area identifiers, callee identifiers, caller identifiers, caller usernames, timeouts, and timestamps, although the caller identifier field 375, timeout field 376, timestamp field 377, local calling area identifier field 378, channel identifier field 379, and caller username field 381 may not be necessary, and one or more of these fields may be omitted in some embodiments.

Furthermore, it will be appreciated that the callee identifier field 374, caller identifier field 375, timeout field 376, and timestamp field 377 of the DID bank table record 370 may be omitted for DID table records that are not in respect of access codes, but rather are in respect of telephone numbers of users of the system, for example, as described in PCT Publication No. 2008/052340. The callee identifier field 374, caller identifier field 375, timeout field 376, and timestamp field 377 of the DID bank table record 370 may also be omitted in embodiments where the access code association table 170 includes records with these types of fields.

For simplicity, the following description is directed to embodiments wherein an access code association table 170 associates access codes with respective callee identifiers, caller identifiers, timeout values, and timestamp values. However, it will be appreciated that the processes described herein for records in the access code association table 170 may additionally or alternatively be applied to DID bank table records 370 in an analogous manner.

Access Code Generator

Referring back to FIGS. 1, 4, and 8 in the illustrated embodiment as described above, the access server 14 transmits (at block 196 illustrated in FIG. 7) an access code request message 110 to the routing controller 30 in order to obtain from the routing controller 30 an access code. When an access code request message 110 is received at the access server interface 242, the processor 232 preferably authenticates the user by making various enquiries of databases to which it has access, to determine whether or not the password in the password field 114 of the access code request message 110 matches a password stored in the database in association with the username in the username field 112. Various functions may be used to pass encryption keys or hash codes back and forth to ensure that the transmittal of passwords is secure. If the user is successfully authenticated, the processor 232 then preferably produces an access code.

Figure 12:
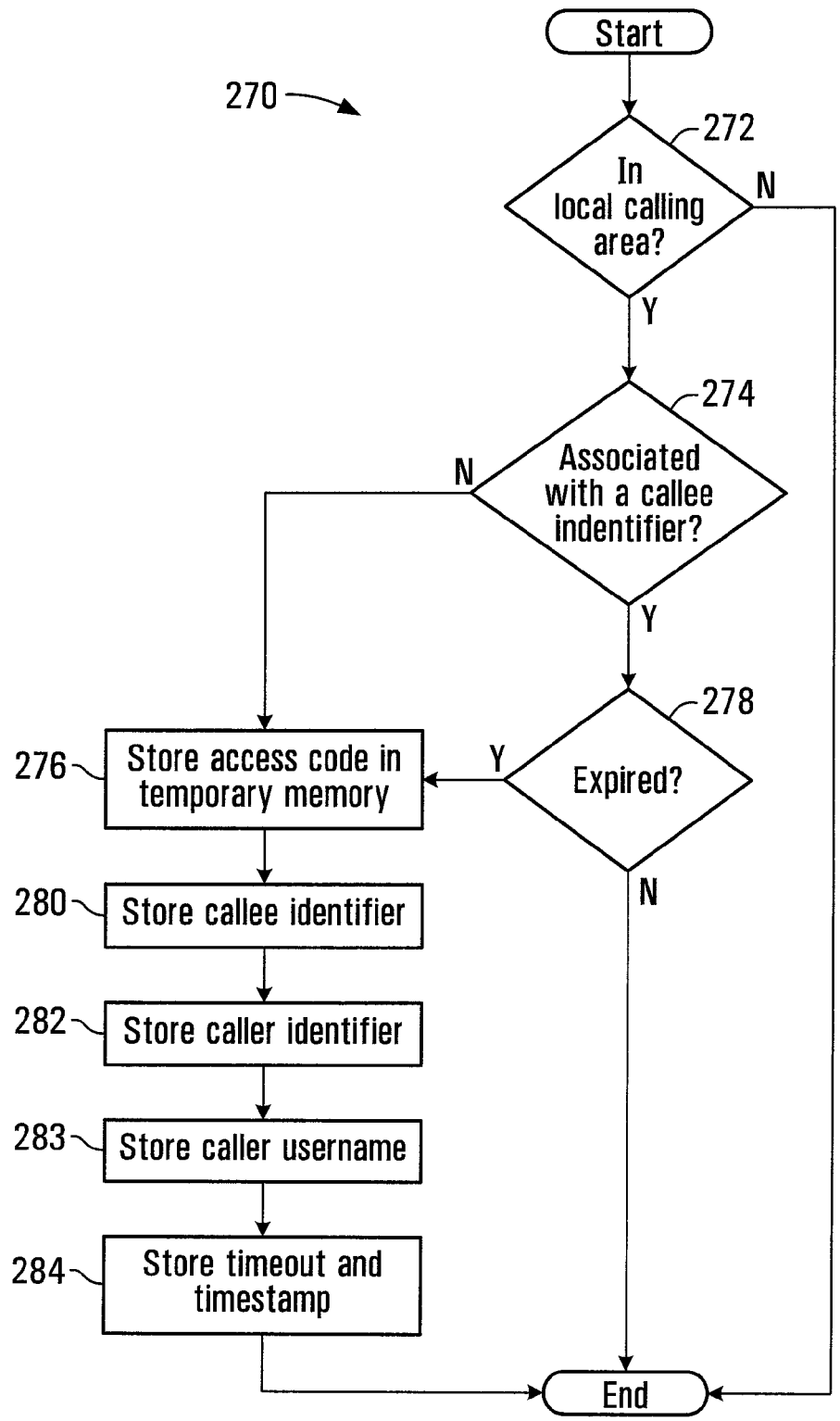
FIG. 12 is a flow chart of a process executed by the routing controller illustrated in FIG. 1.

Referring to FIGS. 8 and 12, a process for producing an access code is shown generally at 270. Essentially the process 270 determines whether the access code in a given record (referred to below as the "currently addressed record") in the access code association table shown at 170 in FIG. 10 is within the local calling area identified by the local calling area identifier store 245, and whether the access code is currently available for association with a callee identifier. In order to produce an access code in response to receiving an access code request message (110) from the access server (14), the processor 232 of the routing controller (30) preferably searches the pool of access codes in the access code association table (170) to identify an access code identifying a channel usable by the mobile telephone (12) to initiate a call to the callee, using the process 270 until an available access code in the local calling area identified by the local calling area identifier store 245 is identified. The access code generator thus preferably selects an access code from the pool of access codes in the access code association table (170), and preferably selects an access code in a local calling area associated with the mobile telephone (12).

Starting with the first record in the access code association table, the process 270 begins at block 272, which directs the processor 232 of the routing controller (30) to determine whether the access code in the currently addressed record of the access code association table 170 is associated with the same local calling area as the mobile telephone (12) as identified by the contents of the local calling area identifier store 245. If at block 272 the access code of the currently addressed record is not associated with the same local calling area as the mobile telephone (12), the process 270 ends, the next record in the access code association table 170 is addressed, and the process is repeated for the next record in the access code association table.

However, if at block 272 the access code of the currently addressed record is associated with the same local calling area as the mobile telephone (12), or if the access code request message 110 (illustrated in FIG. 4) did not include a local calling area identifier, then the process 270 continues at block 274, which directs the processor 232 to determine whether the access code of the currently addressed record is associated with a callee identifier. To do this, the processor 232 determines whether the callee identifier field (177) of the currently addressed record stores a "null" value that was assigned to it on initialization, or whether the callee identifier field instead stores a callee identifier. In other words the processor checks to see whether the currently addressed record has already been in use.

If at block 274 the callee identifier field (177) of the currently addressed record in the access code association table (170) does store a callee identifier and not the "null" value that was assigned to the callee identifier field on initialization (for example, records 174 and 178 in FIG. 10), then the access code of that record is associated with a callee identifier, and the process 270 continues at block 278, which directs the processor 232 to determine whether the association of the callee identifier with the access code has expired. In the illustrated embodiment, the codes at block 278 direct the processor 232 to determine whether the sum of the contents of the timestamp field (182) and of the timeout field (181) in the currently addressed record of the access code association table 170 (shown in FIG. 10) is less than the current time represented by the clock 244. If at block 278 the sum of the timeout and timestamp fields in the currently addressed record of the access code association table 170 is less than the time represented by the clock 244, then the association of the callee identifier with the access code is not expired and the process 270 ends, the next record in the access code association table (170) is addressed, and the process 270 is repeated for the next record in the access code association table.

However, if at block 278 the sum of the contents of the timeout and timestamp fields (181 and 182) in the currently addressed record of the access code association table (170) is not less than the time represented by the clock 244, then the association of the callee identifier with the access code has expired, and the process 270 continues at block 276 which directs the processor 232 to store the contents of the access code field 173 of the currently addressed record in the access code store 250 of the temporary memory 240 of the routing controller 30.

Referring to FIGS. 8, 10, and 12, if at block 274 the callee identifier field in the currently addressed record does not store a callee identifier but stores instead the "null" value that was assigned to the callee identifier field on initialization (for example, records 172, 176, and 180), then the access code of that record is not associated with a callee identifier, and the process 270 continues at block 276, which directs the processor 232 to store the access code from the access code field 173 of the currently addressed record, in the access code store 250 in the temporary memory 240.

After the selected access code is stored in the access code store 250 at block 276, the process 270 continues at block 280, which directs the processor 232 to store the callee identifier from the callee identifier store 246 in the callee identifier field 177 of the currently addressed record, thereby creating an association of the callee identifier with the selected access code.

The process 270 then continues at block 282, which directs the processor 232 to store the caller identifier from the caller identifier store 248 (which identifies the mobile telephone 12 shown in FIG. 1) in the caller identifier field 179 of the currently addressed record of the access code association table 170, thereby also storing the caller identifier in association with the selected access code.

The process 270 then continues at block 283, which directs the processor 232 to store the caller username from the caller username store 249 in the caller username field 183 of the currently addressed record of the access code association table 170, thereby also storing the caller username in association with the selected access code.

The process 270 then continues at block 284, which directs the processor 232 to store timeout and timestamp values in the timeout and timestamp fields 181 and 182 of the currently addressed record of the access code association table 170, thus further storing, in association with the selected access code, a timestamp for use in determining when the usability of the access code to initiate a call to the callee will expire. A default value, such as 10 minutes, for example may be stored in the timeout field 181 of the currently addressed record. Also, the current time indicated by the clock 244 is preferably stored in the timestamp field 182 of the currently addressed record.

In alternative embodiments, the access code association table (170) might not include fields for a caller identifier, caller username, a timeout, or a timestamp. In these embodiments, one or more of blocks 282, 283, and 284 described above are not necessary, and one or more of the caller identifier store 248 and the caller username store 249 may be omitted.

In summary, the access code generator in the illustrated embodiment responds to receiving an access code request message 110 illustrated in FIG. 4 from the access server (14) by first authenticating the user, and then by searching through a pool of access codes, using the process 270 shown in FIG. 12, to identify an access code that is associated with the local calling area identified by the local calling area identifier store (245) and that is not previously and validly associated with another callee identifier. It will be appreciated that in alternative embodiments, different data structures and algorithms may be preferable for identifying an access code that meets the aforementioned criteria. For example, in accordance with conventional database design that is well-known in the art, the records illustrated in the access code association table 170 illustrated in FIG. 10 may alternatively be organized in a binary tree according to the value in the local calling area identifier field 171, or in separate tables for respective local calling area identifiers, for example, in order to enable a more efficient search of the access code association table for an access code that satisfies the aforementioned criteria. Therefore, the access code association table (170) and the process 270 illustrated in FIG. 12 are examples only, and one of ordinary skill in the art will readily appreciate numerous alternative data structures and algorithms.

Gateway

Figures 13, 14:
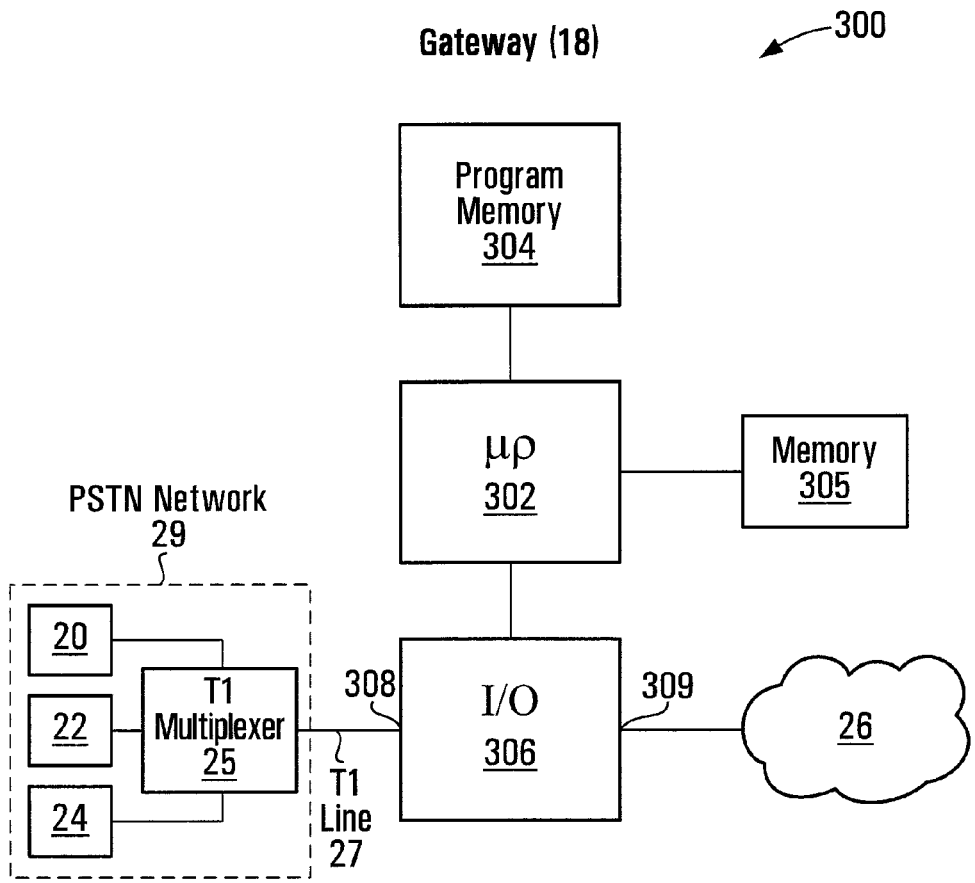
FIG. 13 is a block diagram of a gateway shown in FIG. 1.
FIG. 14 is a tabular representation of an SIP invite message transmitted between the gateway and a call controller illustrated in FIG. 1.

Referring to FIG. 13, in this embodiment, the gateway (18) includes a processor circuit shown generally at 300, which includes a microprocessor 302. The processor circuit 300 also includes a program memory 304, a memory 305, and an I/O port 306, all of which are in communication with the microprocessor 302. The processor circuit 300 may include multiple processors etc., and the aforementioned components of the processor circuit 300 may alternatively be combined.

The I/O port 306 includes a channel interface 308, which, in the illustrated embodiment, is in communication with the channels 20, 22, and 24 that were also illustrated in FIG. 1. Where, as in the illustrated embodiment, the channels 20, 22, and 24 are PSTN telephone lines in the PSTN network 29, the channel interface 308 may, for example, be a T1 port for communication with one or more T1 lines (illustrated at 27 in FIG. 1) of a PSTN service provider, in a manner well-known in the art. The I/O port in the illustrated embodiment also includes an internet interface 309 for interfacing with the IP network 26 illustrated in FIG. 1. The program memory 304 stores blocks of codes for directing the microprocessor 302 to carry out the functions of the gateway (18). It has been found that the AS5350 Universal Gateway available from Cisco Systems, Inc. of San Jose, Calif. may, for example, be suitable as the gateway (18).

Referring back to FIG. 1, and also still to FIG. 13, when a call is received on one of the channels 20, 22, or 24, the microprocessor 302 causes the I/O port 306 to use the internet interface 309 to send a Session Initiation Protocol (SIP) Invite message to a pre-determined node with which the gateway 18 is associated, which in the illustrated embodiment is the first node 11. Generally, the gateway 18 will be associated with a node that is geographically closest to the gateway, in order to minimize transmission times over the IP network 26. In response to the SIP Invite message, the call controller 13 sends an RC request message to the routing controller 30 which makes various enquiries of the database 23 to produce a routing message that is sent back to the call controller 13. The call controller 13 then communicates with the media relay 28 to cause a communications link including an audio path (and a videopath if a videophone call) to be established through the media relay to the same node, a different node, or to a communications supplier gateway as shown generally at 34 to carry audio, and where applicable, video traffic to the call recipient or callee.

Referring to FIG. 14, an exemplary SIP Invite message is shown generally at 310 and includes a caller identifier field 312, a callee identifier field 314, a digest parameter field 315, a call identifier field 316, an IP address field 317, and a gateway UDP port field 318. Examples of values for the fields in the SIP Invite message 310 are shown for illustration purposes only in FIG. 14. The caller identifier in the caller identifier field 312 is preferably in the form of the telephone number of the caller followed by the "@" symbol, which in turn is followed by the IP address of the gateway (18) in the IP network (26). The caller identifier may be determined by retrieving calling line identification (CLID) information from the signal provided by the PSTN network (29) to the gateway (18) for example. Where the caller identification information is not available to the gateway (18), the caller identifier in the caller identifier field 312 preferably includes a pre-assigned number (such as 11111, for example) indicating that the caller identification information was not available, followed by the "@" symbol and then by the IP address of the gateway (18).

The callee identifier in the callee identifier field 314 is the access code identifying the channel (20, 22, or 24 in the example of FIG. 1) on which the call was placed, and which was received from the access server (14). In the illustrated example, the access code is the PSTN telephone number 1-604-345-1212 corresponding to the channel 20 illustrated in FIG. 1, and to the access code stored in the access code field 173 of the record 172 in the exemplary access code association table 170 illustrated in FIG. 10.

The digest parameter in the digest parameter field 315 is generated by the gateway (18) and may uniquely identify the SIP session that is initiated with the SIP Invite message 310.

The call identifier in the call identifier field 316 is, in the illustrated embodiment, a four-digit hexadecimal number generated by the gateway (18) to identify the call, followed by the "@" symbol, which in turn is followed by the IP address of the gateway.

The IP address in the IP address field 317 is the IP address of the gateway (18) in the IP network (26), and the gateway UDP port number in the gateway UDP port field 318 includes a UDP port identifier identifying a UDP port at which the audio/video path will be terminated at the gateway (18).

It should be noted that throughout the description of the embodiments of this invention, the IP/UDP addresses of all elements such as the gateway (18) will be assumed to be valid IP/UDP addresses directly accessible via the Internet or a private IP network, for example, depending on the specific implementation of the system. As such, it will be assumed, for example, that the gateway (18) will have an IP/UDP address directly accessible by the call controllers and the media relays on their respective nodes, and those addresses will not be obscured by Network Address Translation (NAT) or similar mechanisms. In other words, the IP/UDP information contained in SIP messages (for example the SIP Invite message or the RC Request message which will be described below) will match the IP/UDP addresses of the IP packets carrying these SIP messages.

It will be appreciated that in many situations, the IP addresses assigned to various elements of the system may be in a private IP address space, and thus not directly accessible from other elements. Furthermore, it will also be appreciated that NAT is commonly used to share a "public" IP address between multiple devices, for example between home PCs and IP telephones sharing a single Internet connection. For example, the gateway (18) may be assigned an IP address such as 192.168.0.5. This address is located in so called "non-routable" (IP) address space and cannot be accessed directly from the Internet. In order for this device to communicate with other computers located on the Internet, the IP address has to be converted into a "public" IP address, for example 24.14.102.5 assigned by the Internet Service Provider, by a device performing NAT, typically a router. In addition to translating the IP address, NAT typically also translates UDP port numbers, for example an audio path originating at the gateway (18) and using a UDP port 12378 at its private IP address, may have be translated to a UDP port 23465 associated with the public IP address of the NAT device. In other words, when a packet originating from the gateway (18) arrives at an Internet-based node, the source IP/UDP address contained in the IP packet header will be 24.14.102.5:23465, whereas the source IP/UDP address information contained in the SIP message inside this IP packet will be 192.168.0.5:12378. The mismatch in the IP/UDP addresses may cause a problem for SIP-based VoIP systems because, for example, a node will attempt to send messages to a private address but the messages will never get there.

Call Controller

Figure 15:
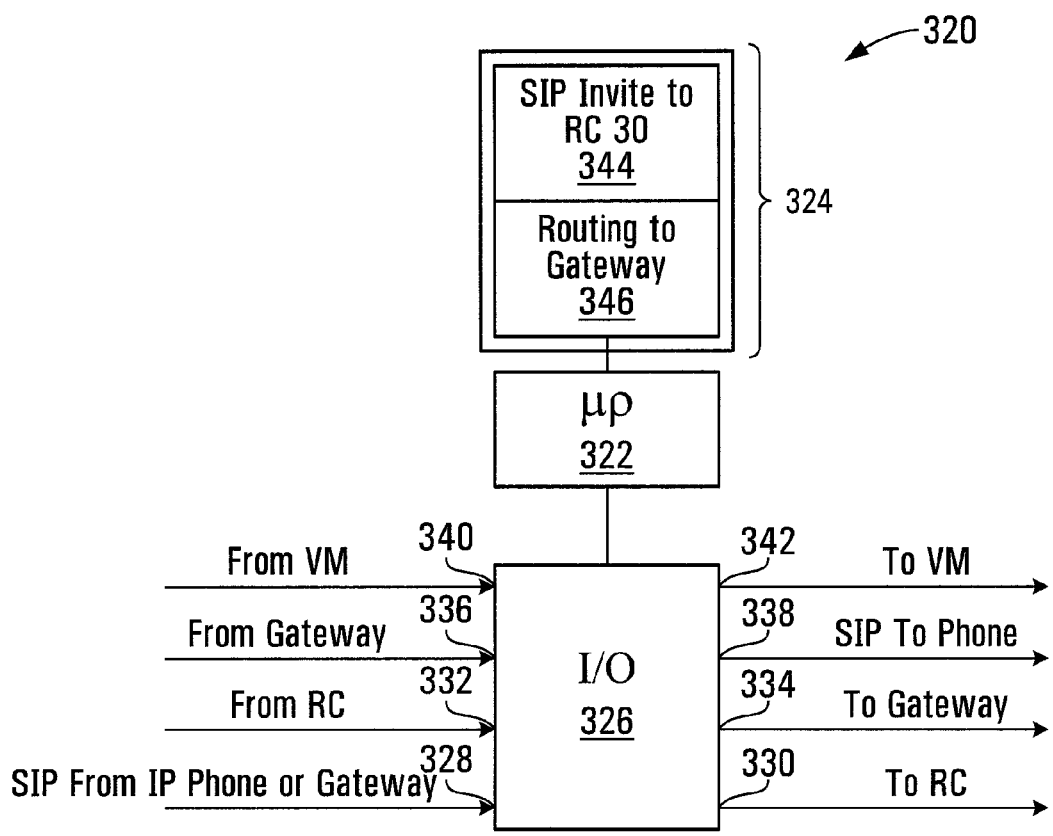
FIG. 15 is a block diagram of the call controller illustrated in FIG. 1.

Referring to FIG. 15, the call controller (13) includes a processor circuit shown generally at 320. The processor circuit 320 includes a microprocessor 322, program memory 324, and an I/O port 326. The program memory 324 and the I/O port 326 are in communication with the microprocessor 322. The processor circuit 320 may include a plurality of microprocessors, a plurality of program memories, and a plurality of I/O ports to be able to handle a large volume of calls. However, for simplicity, the processor circuit 320 will be described as having only one microprocessor 322, program memory 324, and I/O port 326, it being understood that there may be more.

Generally, the I/O port 326 includes an input 328 for receiving messages such as the SIP Invite message from the gateway (18) or from a VoIP telephone (36 in FIG. 1, for example). The I/O port 326 also has an RC request message output 330 for transmitting an RC request message to the routing controller 30 of FIG. 1, an RC message input 332 for receiving routing messages from the routing controller 30, a gateway output 334 for transmitting messages to the gateway 18 and/or 34 shown in FIG. 1 to advise the gateway 18 and/or 34 to establish an audio path, for example, and a gateway input 336 for receiving messages from the gateway 18 and/or 34. The I/O port 326 further includes a SIP output 338 for transmitting messages to the gateway (18 and/or 34) or VoIP telephone (36, for example) to advise the gateway 18 and/or 34 or IP telephone of the IP addresses of the gateways which will establish the audio/video path. The I/O port 326 further includes a voicemail server input and output 340 and 342 respectively for communicating with the voicemail server 19 shown in FIG. 1.

While certain inputs and outputs have been shown as separate, it will be appreciated that some may be a single IP address and IP port. For example, the messages sent to the routing controller (30) and received from the routing controller (30) may be transmitted and received on the same single IP port.

The program memory 324 includes blocks of code for directing the microprocessor 322 to carry out various functions of the call controller (13). For example, these blocks of code include a first block 344 for causing the processor circuit 320 to execute a SIP Invite to RC Request process to produce an RC Request Message in response to a received SIP Invite message. In addition, there is a Routing Message to Gateway message block 346 which causes the processor circuit 320 of the call controller to produce a gateway query message in response to a received routing message from the routing controller (30).

Referring to FIGS. 15 and 16, the SIP Invite to RC Request process is shown in more detail at 344. On receipt of a SIP Invite message of the type shown in FIG. 14, block 350 directs the processor circuit 320 to produce an RC Request Message. Block 352 then directs the processor circuit 320 to cause the RC Request Message to be sent to the routing controller 30 illustrated in FIG. 1.

Referring to FIG. 17, an exemplary RC request message is shown generally at 360 and includes a caller identifier field 362, a callee identifier field 364, a digest parameters field 366, and a call identifier field 368. These fields may be populated with the contents of the caller identifier field 312, callee identifier field 314, digest parameter field 315, and call identifier field 316 respectively of the SIP Invite message 310 illustrated in FIG. 14. In other embodiments, the RC request message may further include a type field (not shown) containing a type code to indicate whether the call is from a third party or from a system subscriber. Other variations of an RC request message are explained in PCT Publication No. WO 2008/052340. A type field (not shown) in the RC request message 360 may be advantageous in embodiments where SIP Invite messages may also be received from an IP telephone that is using VoIP software to make a voice call. However, in the embodiments that are illustrated herein, SIP Invite messages originate from the gateway (18), and therefore a type designation is not necessary and may be omitted from the RC request message 360. In embodiments where a SIP Invite message may be received from an IP telephone, the SIP invite to RC request process shown in FIG. 16 may require additional steps, as illustrated in FIG. 5 of PCT Publication No. WO 2008/052340.

RC Request Message Handler

Figure 18A:
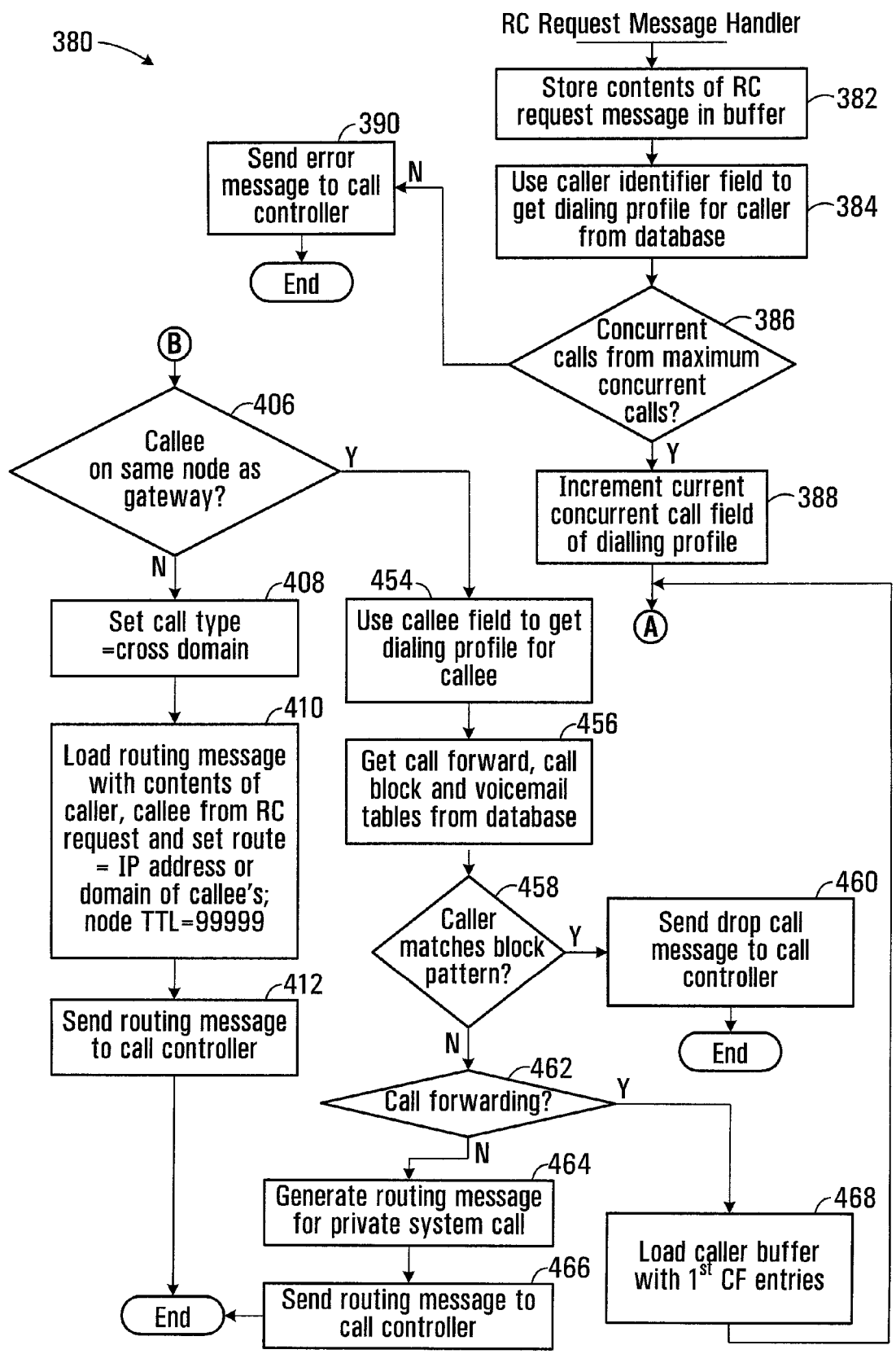
FIGS. 18A-18C are a flow chart of a process executed by the routing controller illustrated in FIG. 1.

As illustrated in FIG. 8, the program memory 234 includes an RC request message handler 380 which directs the routing controller (30) to produce a routing message in response to a received RC request message (360). Referring to FIG. 18A, the RC request message handler 380 begins with a first block 382 that directs the RC processor circuit (230) to separately store the contents of the callee identifier field 364 and caller identifier field 362 of the RC request message (360) in the callee identifier store 246 and the caller identifier store 248 respectively of FIG. 8.

Block 384 then directs the RC processor circuit (230) to use the contents of the caller username store 249 to locate and retrieve from the database (23) a dialing profile 200 associated with the caller, as described above and illustrated in FIG. 9, for example. The retrieved dialing profile may then be stored in the temporary memory 240, for example.

Figure 18B:
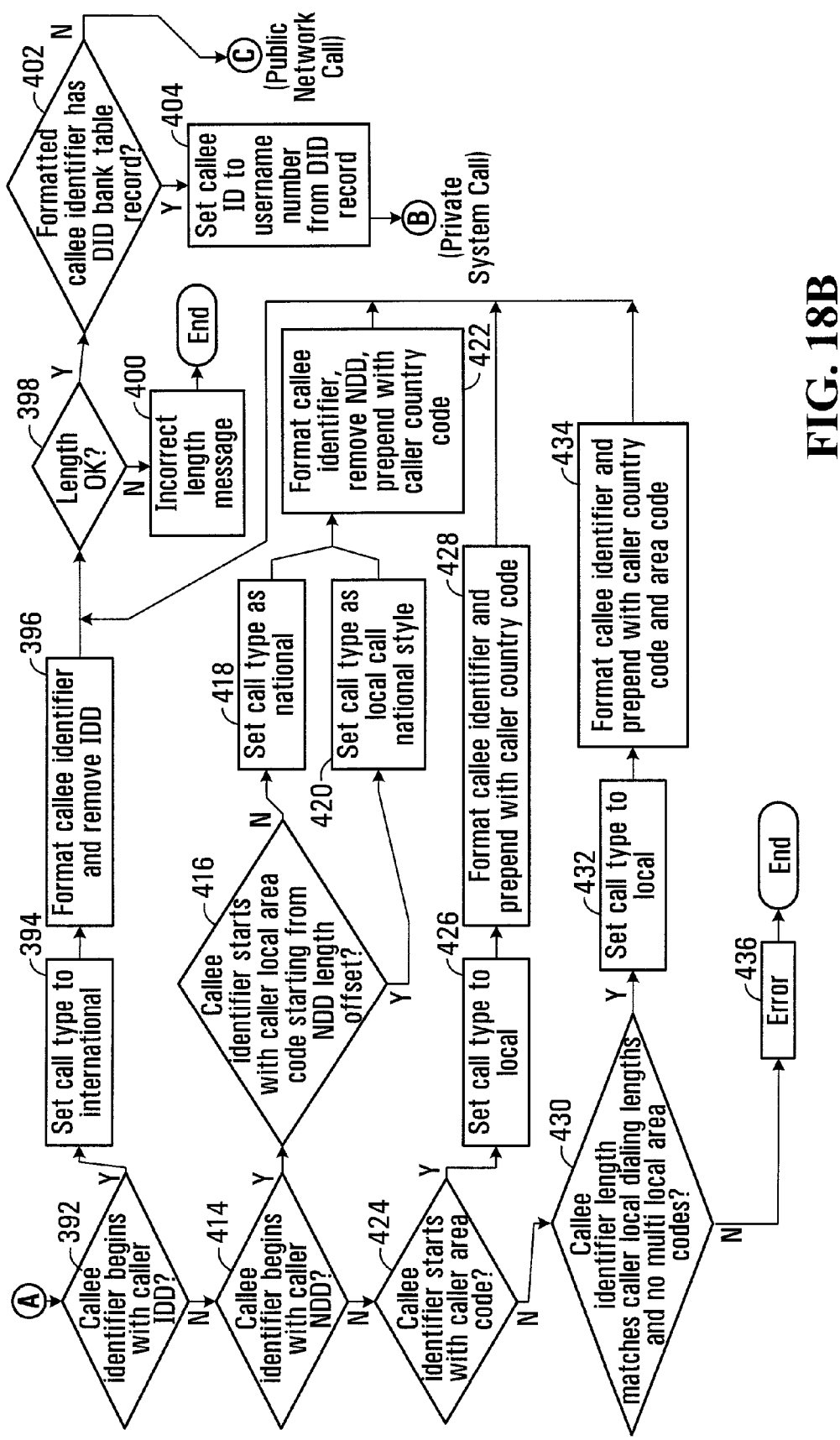

The RC request message handler 380 continues at block 386, which directs the processor circuit (230) of the routing controller to determine whether the contents of the current number of concurrent calls field 222 of the dialing profile 200 shown in FIG. 9 are less than the contents of the maximum number of concurrent calls field 220 of the dialing profile for the caller and, if so, block 388 directs the processor circuit to increment the contents of the current number of concurrent calls field 222 and the processor circuit (230) is directed to point A in FIG. 18B. If the contents of the current number of concurrent calls field 222 are equal to or greater than the contents of the maximum number of concurrent calls field 220, then block 390 directs the processor circuit (230) to send an error message back to the call controller (13) to cause the call controller to notify the caller that the maximum number of concurrent calls has been reached and no further calls can exist concurrently, including the presently requested call.

Assuming that block 386 allows the call to proceed, the RC processor circuit (230) is directed to perform certain checks on the callee identifier in the callee identifier field 246 in FIG. 8. These checks are shown in greater detail in FIG. 18B.

Referring to FIG. 18B, the RC processor circuit (230) is directed to a first block 392 that causes it to determine whether a digit pattern of the callee identifier includes a pattern that matches the contents of the international dialing digits (IDD) field 208 in the dialing profile 200 (shown in FIG. 9) associated with the caller. If so, then block 394 directs the RC processor circuit (230) to set a call type code identifier variable maintained by the processor to indicate that the call is an international call, and block 396 directs the processor to produce a reformatted callee identifier by reformatting the callee identifier into a predefined digit format. In this embodiment, this is done by removing the pattern of digits matching the IDD field contents (208) of the caller dialing profile 200 to effectively shorten the callee identifier. Then, block 398 directs the RC processor circuit (230) to determine whether or not the callee identifier has a length which meets criteria establishing it as a number compliant with the E.164 Standard set by the ITU. If the length does not meet these criteria, then block 400 directs RC processor circuit (230) to send back to the call controller (13) a message indicating the length is not correct. The process 380 is then ended. At the call controller 13, routines (not shown) stored in the program memory 324 may direct the processor circuit (320 of FIG. 15) to respond to the incorrect length message by transmitting a message back to the mobile telephone (12 shown in FIG. 1) to indicate that an invalid number has been dialed.

If the length of the amended callee identifier meets the criteria set forth at block 398, then block 402 directs the RC processor circuit (230) to make a database request to the database (23) to determine whether or not the amended callee identifier is found in the DID field (373) of a record such as shown in FIG. 11 in the DID bank table. If at block 402 the RC processor circuit (230) receives a response from the database (23) indicating that the reformatted callee identifier produced at block 396 is found in the DID field (373) of a record in the DID bank table, then the callee is a subscriber to the system and the call is classified as a private network call by directing the processor to block 404, which directs the RC processor circuit (230) to copy the contents of the corresponding username field (371 in FIG. 11) from the callee DID bank table record (370 in FIG. 11) into the callee identifier store (246 in FIG. 8). Thus, the RC processor circuit (230) locates a subscriber username associated with the reformatted callee identifier. The processor (232) is then directed to point B in FIG. 18A.

Calls to Subscribers in Different Nodes

Referring back to FIG. 1, as noted above, the gateway 18 is preferably associated with a pre-determined node, which in the illustrated embodiment is the first node 11. Referring back to FIG. 18A, block 406 directs the processor (232 of FIG. 8) to execute a process to determine whether or not the node associated with the reformatted callee identifier in the callee identifier store (246 in FIG. 8, which, at block 404, was set to be a username of the callee) is the same node that is associated with the gateway 18 illustrated in FIG. 1.

To do this, the processor (232) may, for example, identify a node associated with the gateway (18) by using an IP address associated with the gateway to determine a node identifier of the gateway. An IP address associated with the gateway (18) may, for example, be obtained from either the caller identifier field 362 or the call identifier field 368 of the RC request message 360 illustrated in FIG. 17, as each of these fields includes a portion following an "@" symbol that indicates an IP address of the gateway. In order to determine a node identifier associated with the gateway (18) using the IP address associated with gateway (18), the processor 232 (illustrated in FIG. 8) may access a gateway node association table stored in the database 23 (illustrated in FIG. 1).

Referring to FIG. 19, an exemplary gateway node association table is shown generally at 480. The exemplary gateway node association table 480 includes first and second records 482 and 484, each having a respective gateway IP address field 486 and a respective node identifier field 488. It will be appreciated that the exemplary gateway node association table 480 is an example for illustration purposes only. The values in the gateway IP address fields 486 are preferably initialized when a gateway (such as the gateway 18 illustrated in FIG. 1) is installed as part of the system (10), and are preferably updated as the IP addresses of the respective gateways may change from time to time. The values in the node identifier fields 488 are also preferably initialized when a gateway (such as the gateway 18 illustrated in FIG. 1) is installed as part of the system (10).

As indicated above, the reformatted callee identifier in the callee identifier store (246 in FIG. 8) was set at block 404 in FIG. 18B to be a username of the callee from the username field 371 (illustrated in FIG. 11), and in this embodiment, a prefix of the username of the callee preferably indicates a node associated with the callee. In the illustrated embodiment, the left-most digit in the username of the callee is a continent code, which is a sufficient prefix to identify a node associated with the callee. However, it will be appreciated that in other embodiments, other prefixes or other information may identify the associated node. Preferably, the values in the node identifier fields 488 correspond to the prefixes of the usernames in the username fields 371 (illustrated in FIG. 11), so that the node associated with the callee is the same node that is associated with the gateway 18 illustrated in FIG. 1 if the prefix of the username of the callee matches the node identifier associated with the gateway (18). Therefore, in the illustrated embodiment, if the reformatted callee identifier in the callee identifier store (246 in FIG. 8) is 2001 1050 8667, for example, then in the example of FIG. 19, the node associated with the callee is the same node as the node identified by the continent code "2" that is associated with the gateway associated with the IP address 20.14.102.5 in the record 482, but is not the same node as the node identified by the continent code "5" that is associated with the gateway associated with the IP address 104.12.131.12 in the record 484.

Referring back to FIG. 18A, if at block 406 the prefix of the username of the callee does not match the node identifier associated with the gateway (18), then the call is a "cross-domain" call, and block 408 in FIG. 18A directs the processor (232 in FIG. 8) to set a call type flag in the temporary memory (240 in FIG. 8) to indicate the call is a cross-domain call. Then, block 410 of FIG. 18A directs the processor (232 of FIG. 8) to produce a routing message identifying an address on the private network with which the callee identified by the contents of the callee ID buffer is associated and to set a time to live for the call at a maximum value of 99999, for example. Routing messages and time to live values, and also a method of determining the node in the system with which the callee is associated, are further described in PCT Publication No. WO 2008/052340. Once a routing message is produced at block 410, block 412 directs the processor (232 in FIG. 8) to cause the routing message to be sent to the call controller 13 shown in FIG. 1, and the process ends.

Referring back to FIG. 18B, if at block 392, the callee identifier stored in the callee identifier store (246 in FIG. 8) does not begin with an international dialing digit, then block 414 directs the processor (232) to determine whether or not the callee identifier begins with the same national dial digit code as assigned to the caller. To do this, the processor (232) is directed to refer to the retrieved caller dialing profile as shown in FIG. 9. In FIG. 9, the national dialing digit code 206 is the number 1. Thus, if the callee identifier begins with the number 1, then the processor (232) is directed to block 416 in FIG. 18B.

Block 416 directs the processor (232 of FIG. 8) to examine the callee identifier to determine whether or not the digits following the NDD digit identify an area code that is the same as any of the area codes identified in the local area codes field 212 of the caller dialing profile 200 shown in FIG. 9. If not, block 418 of FIG. 18B directs the processor (232) to set the call type flag to indicate that the call is a national call. If the digits following the NDD digit identify an area code that is the same as a local area code associated with the caller as indicated by the caller dialing profile, block 420 directs the processor (232) to set the call type flag to indicate a local call, national style. After executing block 418 or 420, block 422 directs the processor (232) to format the callee identifier into a pre-defined digit format to produce a re-formatted callee identifier by removing the national dialed digit and prepending a caller country code identified by the country code field 210 of the caller dialing profile shown in FIG. 9. The processor (232) is then directed to block 398 of FIG. 18B to perform other processing as already described above.

If at block 414, the callee identifier does not begin with a national dialed digit, block 424 directs the processor (232) to determine whether the callee identifier begins with digits that identify the same area code as the caller. Again, the reference for this is the retrieved caller dialing profile shown in FIG. 9. The processor (232) determines whether or not the first few digits of the callee identifier identify an area code corresponding to the contents of any area code identifier stored in the local area code field 212 of the retrieved caller dialing profile 200 (illustrated in FIG. 9). If so, then block 426 directs the processor (232) to set the call type flag to indicate that the call is a local call. It should be noted that the call will not necessarily be a local call in every case where the first few digits of the callee identifier identify an area code corresponding to the contents of an area code identifier stored in the local area code field 212 (illustrated in FIG. 9), and other determinations of when a call is to be considered local may be appropriate. However, it has been found that the determination described above for block 424 is satisfactory for some purposes. Next, block 428 directs the processor (232) to format the callee identifier into a pre-defined digit format to produce a reformatted callee identifier by prepending the caller country code to the callee identifier, the caller country code being determined from the country code field 210 of the retrieved caller dialing profile 200 shown in FIG. 9. The processor (232) is then directed to block 398 for further processing as described above.

If at block 424, the callee identifier does not start with the same area code as the caller, block 430 directs the processor (232 of FIG. 8) to determine whether the number of digits in the callee identifier, i.e. the length of the callee identifier, is within the range of digits indicated by the caller minimum local number length field 214 and the caller maximum local number length field 216 of the retrieved caller dialing profile 200 shown in FIG. 9, and whether there is more than one area code identifier stored in the local area code field 212 of the retrieved caller dialing profile. If the number of digits in the callee identifier is within the aforementioned range and there is only one area code identifier stored in the local area code field (212), then block 432 directs the processor (232) to set the call type flag to indicate a local call and block 434 directs the processor (232) to format the callee identifier into a pre-defined digit format to produce a reformatted callee identifier by prepending to the callee identifier the caller country code (as indicated by the country code field 210 of the retrieved caller dialing profile 200 shown in FIG. 9) followed by the caller area code as indicated by the local area code stored in the local area code field 212 of the caller dialing profile 200 shown in FIG. 9. The processor (232) is then directed to block 398 of FIG. 18B for further processing as described above.

If at block 430, the callee identifier has a length that does not fall within the range specified by the caller minimum local number length field (214 in FIG. 9) and the caller maximum local number length field (216 in FIG. 9), or if there is more than one area code identifier stored in the local area code field 212 of the retrieved caller dialing profile 200 illustrated in FIG. 9, then block 436 directs the processor (232) to send an error message back to the call controller (13), and the process ends.

In alternative embodiments, such as those illustrated in PCT Publication No. WO 2008/052340, an additional block (402 in FIG. 8B of PCT Publication No. WO 2008/052340) may determine whether the callee identifier is a valid username. However, in the embodiment disclosed herein, the callee identifier is assumed to be a telephone number of the callee, and not a username.

From FIG. 18B, it will be appreciated that there are certain groups of blocks of codes that direct the processor 232 in FIG. 8 to determine whether the callee identifier has certain features such as an international dialing digit, a national dialing digit, an area code and a length that meet certain criteria, and cause the processor 232 to reformat the callee identifier stored in the callee identifier store 246 in FIG. 8, as necessary into a predetermined target format including only a country code, area code, and a normal telephone number, for example, to cause the callee identifier to be compatible with the E.164 number plan standard in this embodiment. This enables block 402 in FIG. 18B to have a consistent format of callee identifiers for use in searching through the DID bank table records 370 of the type shown in FIG. 11 to determine how to route calls to subscribers on the same system. Effectively, therefore blocks 392, 414, 424, and 430 establish call classification criteria for classifying the call as a public network call or a private network call. Block 402 classifies the call, depending on whether or not the formatted callee identifier has a DID bank table record, and this depends on how the call classification criteria are met.

Calls to Non-Subscribers

Not all calls will be to subscribers, and this will be detected by the processor 232 of FIG. 8 when it executes block 402 in FIG. 18B, and does not find a DID bank table record (370 illustrated in FIG. 11) that is associated with the callee, in the DID bank table. When this occurs, the call is classified as a public network call, by directing the processor (232) to point C in FIG. 18C.

Figure 18C:
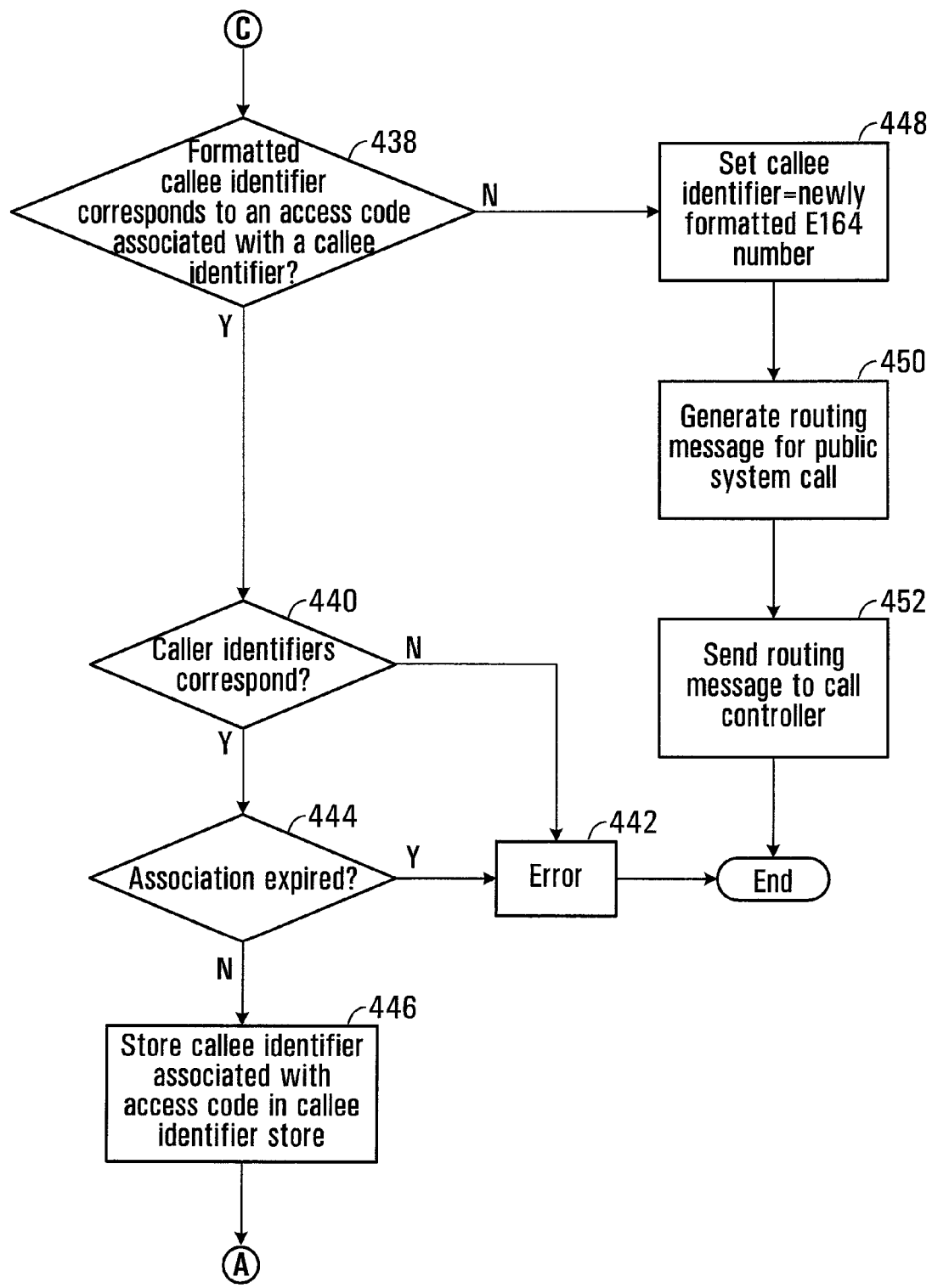

Referring to FIG. 18C, block 438 directs the processor (232) to determine whether the formatted callee identifier in the callee identifier store 246 in FIG. 8 corresponds to an access code in the access code field 173 of a record in the access code association table 170 illustrated in FIG. 10 that is associated with a callee identifier. Because the callee identifier in the callee identifier store 246 in FIG. 8 has been formatted as described above with reference to FIG. 18B, block 438 may involve determining whether an access code in the access code field 173 of a record of the access code association table 170 (illustrated in FIG. 10) matches the formatted callee identifier in the callee identifier store 246 in FIG. 8, and also whether a callee identifier (as opposed to the "null" value assigned on initialization) is stored in the callee identifier field 177 in association with the access code. As noted above, for simplicity, this description is directed to embodiments wherein an access code association table 170 associates access codes with respective callee identifiers, caller identifiers, timeout values, and timestamp values, although it will be appreciated that the processes described herein for records in the access code association table 170 may additionally or alternatively be applied to DID bank table records 370 in an analogous manner.

If at block 438 the formatted callee identifier in the callee identifier store 246 in FIG. 8 is the same as an access code in the access code field (173) of a record of the access code association table 170 illustrated in FIG. 10 that is associated with a callee identifier, then block 440 directs the processor (232) to determine whether the caller identifier in the caller identifier store 248 (illustrated in FIG. 8) is the same as the caller identifier in the caller identifier field (179) of the record of the access code association table (170), and thus whether the caller identifier in the caller identifier field (179) of the record of the access code association table (170) identifies the mobile telephone identified by the caller identifier in the caller identifier store 248. If not, then block 442 directs the processor (232) to send an error message to the call controller (13), and the process ends.

But if at block 440 the caller identifier in the caller identifier store 248 (illustrated in FIG. 8) corresponds to the caller identifier in the caller identifier field (179) of the record of the access code association table (170), then the routing controller (30) will produce a routing message that will cause the call controller to establish communication through the IP network (26) to the callee in response to a call received at a channel (20, 22, or 24). Preferably, block 444 includes codes that direct the processor (232) to determine whether the association of the access code with the callee identifier has expired, and thus whether the usability of the access code to initiate a call to the callee has expired, in the manner described above for block 278 in FIG. 12. If at block 444 the association of the access code with the callee identifier has expired, then block 442 directs the processor (232) to send an error message to the call controller (13), and the process ends. Thus the routing controller produces a routing message that causes the call controller to establish the call only when the association of the access code with the callee identifier has not expired.

It will be appreciated that in alternative embodiments, one or more of the caller identifier, timeout, and timestamp fields 179, 181, and 182 may be omitted from the access code association table 170 illustrated in FIG. 10, and in these embodiments, one or more of the blocks 440, 442, and 444 may also be omitted.

If at block 444 the association of the access code with the callee identifier has not expired, or if one or both of blocks 440 and 444 is omitted, then block 446 directs the processor (232) to store the callee identifier from the callee identifier field 177 of the record of the access code association table (170) in the callee identifier store 246 illustrated in FIG. 8. The processor (232) is then directed to point A in FIG. 18B to repeat the steps illustrated in FIG. 18B using the callee identifier retrieved from the callee identifier field (177) in the record of the access code association table (170).

However, if at block 438 the formatted callee identifier in the callee identifier store 246 in FIG. 8 does not correspond to an access code in a record of the access code association table 170 illustrated in FIG. 10 that is associated with a callee identifier, then block 448 of FIG. 18B causes the processor (232) to set the contents of the callee identifier store 246 of FIG. 8 to be the newly formatted callee identifier, i.e., a number compatible with the E.164 standard. Then, block 450 of FIG. 18B directs the processor (232) to generate a routing message identifying a gateway to the public network usable by the call controller (13) to establish a "public system" call. In one embodiment, block 450 includes codes that, for example, direct the processor (232) to search a database of route or master list records and to search a database of supplier records to identify at least one supplier operable to supply a communications link for the call, and to load a routing message buffer with supplier information, time to live values, and timeout values. An example of an implementation of these steps is described with reference to blocks 410, 412, 560, 562, 563, 564, 566, and 571 in FIGS. 8B and 8D in PCT Publication No. WO 2008/052340. Next, block 452 directs the processor (232) of FIG. 10 to send the routing message to the call controller (13) in FIG. 1, and the process ends.

Calls to Subscribers within the Same Node

Referring back to FIG. 18A, if at block 406, the prefix of the username of the callee matches the node identifier associated with the gateway (18), then the call is on one domain, and block 454 directs the processor (232) to use the callee identifier in the callee identifier store 246 illustrated in FIG. 8 (which, at block 404, was set to be a username of the callee) to locate and retrieve a dialing profile for the callee. The dialing profile may be of the type shown in FIG. 9, for example. Block 456 of FIG. 18A then directs the processor 232 of FIG. 8 to get call block, call forward, and voicemail records from the database 23 of FIG. 1, based on the username identified in the callee dialing profile retrieved by the processor at block 454. Exemplary call block, call forward, and voicemail records are described in PCT Publication No. WO 2008/052340.

Then block 458 directs the processor 232 of FIG. 8 to determine whether or not the caller identifier received in the RC request message matches a block pattern stored in the call block record associated with the callee and retrieved at block 454. If the caller identifier matches a block pattern, then block 460 directs the processor to send a drop call or non-completion message to the call controller (13) and the process is ended. If the caller identifier does not match a block pattern associated with the callee, then block 462 directs the processor (232) to determine whether or not call forwarding is required, as described in PCT Publication No. WO 2008/052340.

If at block 462, the call forwarding record for the callee indicates that no call forwarding is required, then the processor (232) is directed to block 464, which directs the processor (232) to generate a routing message identifying an address on the private network, associated with the callee for a "private system" call. In one embodiment, block 464 includes codes that, for example, direct the processor (232) to store, in a routing message buffer, a username and domain of the callee, time to live values, and an IP address of the current node, to determine whether or not the user identified by the callee identifier has paid for voicemail service and if so, to store voicemail information in the routing message buffer. An example of an implementation of these steps is described with reference to blocks 609, 620, 640, 642, and 644 in FIGS. 8A and 8C in PCT Publication No. WO 2008/052340, which is incorporated herein by reference. Next, block 466 directs the processor 232 of FIG. 8 to cause the routing message to be sent to the call controller 13 in FIG. 1, and the process ends.

But if at block 462, the call forwarding record for the callee indicates that call forwarding is required, then block 468 directs the processor (232) to search a dialing profile table to find a dialing profile record as shown in FIG. 9, for the user identified by the destination number field of the call forward record, as illustrated in PCT Publication No. WO 2008/052340. The processor (232) is further directed to store the username and domain for that user and a time to live value in a routing message buffer, an example of which is described in PCT Publication No. WO 2008/052340. This process is repeated for each call forwarding record associated with the callee identified by the callee identifier store 246 in FIG. 8 to add to the routing message buffer all call forwarding usernames and domains associated with the callee.

Referring to FIGS. 1, 18A, and 18C, the routing message sent at one of blocks 412, 452, and 466 is received at the call controller 13 and the call controller interprets the receipt of the routing message as a request to establish a call. Referring to FIG. 15, the program memory 324 of the call controller 13 includes a routing to gateway routine depicted generally at 346.

Where a routing message received at the call controller 13 is of the type produced at block 464 shown in FIG. 18A, indicating that the callee is a system subscriber on the same node as the gateway (18) (such as a user of the VoIP telephone 36 illustrated in FIG. 1), the routing to gateway routine 346 may direct the microprocessor 322 to cause a message to be sent back through the IP network 26 shown in FIG. 1 to the VoIP telephone (36), using the IP address of the VoIP telephone (36) that is available from the callee username.

Alternatively, if the routing message received at the call controller 13 is of the type produced at block 410 shown in FIG. 18A, identifying a domain associated with another node in the system, the call controller 13 may send a SIP invite message along the high speed/high data throughput link 17 in communication with the other node. The other node may function as explained above and in PCT Publication No. WO 2008/052340, in response to receipt of a SIP invite message.

If the routing message received at the call controller 13 is of the type produced at block 450 shown in FIG. 18C, indicating that the callee is not a subscriber to the system (such as a user of the PSTN telephone 32 that is in communication with the IP network 26 through the gateway 34 as illustrated in FIG. 1), the call controller sends one or more SIP invite messages to the suppliers identified in the routing message to identify the IP address of a supplier that is able to carry the call, such as the IP address of the gateway 34 illustrated in the example of FIG. 1. A process for identifying the IP address of a supplier that is able to carry the call is given in PCT Publication No. WO 2008/052340, which is incorporated herein by reference. In some cases, the gateway of the supplier that is able to carry the call will be the gateway 18 illustrated in FIG. 1, that is, the same gateway through which the caller telephone (12) initiated the call. For simplicity, the following description assumes that the gateways 18 and 34 are distinct gateways. It will be understood that in some cases, they may be the same gateway, but in these cases, the following steps may still be applied.

Referring to FIG. 1, the IP address of the gateway 34 is sent in a message from the call controller 13 to the media relay 28, which responds with a message indicating an IP address to which the gateway 18 should send its audio/video traffic, and an IP address to which the gateway 34 should send its audio/video for the call. The call controller conveys the IP address at which the media relay 28 expects to receive audio/video from the gateways 18 and 34, to the gateways 18 and 34 in one or more messages. The gateway 18 replies to the call controller 13 with an IP address at which it would like to receive audio/video, and the call controller conveys that IP address to the media relay 28. The call may then be conducted between the caller and callee through the media relay 28 and the gateways 18 and 34.

If the call controller 13 receives a routing message of the type produced at block 464 shown in FIG. 18A, indicating that the callee is a system subscriber on the same node as the gateway (18) (such as a user of the VoIP telephone 36 illustrated in FIG. 1), and which has at least one call forwarding number and/or a voicemail number, the call controller attempts to establish a call to the callee VoIP telephone 36 by seeking from the callee telephone a message indicating an IP address to which the media relay 28 should send audio/video. If no such message is received from the callee telephone, no call is established. If no call is established within a pre-determined time, the call controller 13 attempts to establish a call with the next user identified in the call routing message in the same manner. This process is repeated until all call forwarding possibilities have been exhausted, in which case the call controller communicates with the voicemail server 19 identified in the routing message to obtain an IP address to which the media relay 28 should send audio/video and the remainder of the process mentioned above for establishing IP addresses at the media relay and the caller telephone is carried out to establish audio/video paths to allowing the caller to leave a voicemail message with the voicemail server.

When an audio/video path through the media relay 28 is established, a call timer maintained by the call controller 13 preferably logs the start date and time of the call and logs the call ID and an identification of the route (i.e., audio/video path IP address) for later use in billing.

Terminating the Call

Referring back to FIG. 1, in the event that the caller terminates a call, the gateway 18 sends a SIP bye message to the call controller 13. Similarly, in the event that the callee terminates the call, the gateway 34 or the VoIP telephone 36 of the callee sends a SIP bye message to the call controller 13. Exemplary SIP bye messages are described in PCT Publication No. WO 2008/052340. The SIP bye message is received at the call controller 13, and the call controller executes a process that involves decrementing the contents of the current number of concurrent calls field 222 dialing profile 200 of the caller as illustrated in FIG. 9, generating an RC call stop message (not shown), sending the RC call stop message to the routing controller 30, and sending a "bye" message to the party that did not terminate the call. An exemplary RC call stop message, and an example of how these steps may be implemented, are described in PCT Publication No. WO 2008/052340, which is incorporated herein by reference.

When the routing controller 30 receives the RC call stop message from the call controller 13, the routing controller executes an RC call stop message process that involves making various updates to subscriber, reseller, and supplier account records (not shown) following the call. Examples of subscriber, reseller, and supplier account records, and of updates to subscriber, reseller, and supplier account records, are described in PCT Publication No. WO 2008/052340, which is incorporated herein by reference.

While specific embodiments of the invention have been described and illustrated, such embodiments should be considered illustrative of the invention only and not as limiting the invention.

What is claimed is:

1. A method of roaming with a mobile telephone, the method comprising:
   receiving, from a user of the mobile telephone, a callee identifier associated with the callee;
   transmitting an access code request message to an access server to seek an access code from a pool of access codes wherein each access code in said pool of access codes identifies a respective telephone number or Internet Protocol (IP) network address that enables a local call to be made to call the callee identified by the callee identifier, said access code request message including said callee identifier and a location identifier separate and distinctive from said callee identifier, said location identifier identifying a location of the mobile telephone;
   receiving an access code reply message from the access server in response to said access code request message, said access code reply message including an access code different from said callee identifier and associated with said location identifier and/or associated with a location pre-associated with the mobile telephone and wherein said access code expires after a period of time; and
   initiating a call with the mobile telephone using said access code to identify the callee.

2. The method of claim 1 wherein transmitting comprises transmitting said access code request message to said access server on a non-voice network.

3. The method of claim 1 wherein transmitting said location identifier comprises transmitting an IP address of the mobile telephone in a wireless IP network.

4. The method of claim 1 wherein transmitting said location identifier comprises transmitting an identifier of a wireless voice signal station in wireless communication with the mobile telephone.

5. The method of claim 1 wherein transmitting said location identifier comprises transmitting a user-configured identifier of a location associated with the mobile telephone.

6. The method of claim 1 wherein receiving said access code reply message comprises receiving said access code reply message from said access server on a non-voice network.

7. The method of claim 1 wherein receiving said access code reply message comprises receiving, in said access code reply message, an access code temporarily associated with said callee identifier.

8. The method of claim 1 wherein receiving said access code reply message comprises receiving, in said access code reply message, a telephone number identifying a channel operably configured to cooperate with an IP network to cause a call involving the mobile telephone and the callee to be routed through the IP network.

9. The method of claim 8 wherein initiating said call comprises engaging a routing controller to route said call on said IP network to the callee.

10. The method of claim 1 further comprising:
receiving from the mobile telephone said access code request message;
communicating with a routing controller to obtain from the routing controller said access code wherein said access code identifies a communications channel associated with said location identifier and wherein said access code is useable by the mobile telephone to cause the routing controller to establish a call to the callee using the channel; and
transmitting said access code reply message to the mobile telephone.

11. A mobile telephone apparatus comprising:
means for receiving, from a user of the mobile telephone, a callee identifier associated with the callee;
transmitting means for transmitting an access code request message to an access server to seek an access code from a pool of access codes wherein each access code in said pool of access codes identifies a respective telephone number or Internet Protocol (IP) network address that enables a local call to be made to call the callee identified by the callee identifier, said access code request message including said callee identifier and a location identifier separate and distinctive from said callee identifier, said location identifier identifying a location of the mobile telephone;
means for receiving an access code reply message from the access server in response to said access code request message, said access code reply message including an access code different from said callee identifier and associated with said location identifier and/or associated with a location pre-associated with the mobile telephone and wherein said access code expires after a period of time; and
means for initiating a call using said access code to identify the callee.

12. The mobile telephone apparatus of claim 11 wherein said transmitting means comprises a non-voice network interface for transmitting said access code request message to said access server on a non-voice network.

13. The mobile telephone apparatus of claim 11 wherein said location identifier comprises an IP address of the mobile telephone in a wireless IP network.

14. The mobile telephone apparatus of claim 11 wherein said location identifier comprises an identifier of a wireless voice signal station in wireless communication with the mobile telephone.

15. The mobile telephone apparatus of claim 11 wherein said location identifier comprises a user-configured identifier of a location associated with the mobile telephone.

16. The mobile telephone apparatus of claim 11 wherein said means for receiving an access code reply message comprises a non-voice network interface for receiving said access code reply message on a non-voice network.

17. The mobile telephone apparatus of claim 11 wherein said access code includes a telephone number.

18. The mobile telephone apparatus of claim 11 wherein said means for initiating comprises a mobile telephone network interface.

19. A system for enabling roaming by a mobile telephone, the system comprising the mobile telephone apparatus of claim 11 and further comprising:
a routing controller; and
an access server comprising:
means for receiving from the mobile telephone said access code request message;
means for communicating with said routing controller to obtain from said routing controller said access code wherein said access code identifies a channel associated with said location identifier and wherein said access code is useable by the mobile telephone to cause the routing controller to establish a call to the callee using the channel; and
means for transmitting said access code reply message including said access code to the mobile telephone.

20. A mobile telephone apparatus comprising:
a processor circuit;
a network interface in communication with said processor circuit; and
a computer readable medium in communication with said processor circuit and encoded with codes for directing said processor circuit to:
receive, from a user of the mobile telephone, a callee identifier associated with the callee;
cause an access code request message to be transmitted to an access server to seek an access code from a pool of access codes wherein each access code in said pool of access codes identifies a respective telephone number or Internet Protocol (IP) network address that enables a local call to be made to call the callee identified by the callee identifier, said access code request message including said callee identifier and a location identifier separate and distinctive from said callee identifier, said location identifier identifying a location of the mobile telephone;
receive an access code reply message from the access server in response to said access code request message, said access code reply message including an access code different from said callee identifier and associated with said location identifier and/or associated with a location pre-associated with the mobile telephone and wherein said access code expires after a period of time; and
initiate a call using said access code to identify the callee.

21. The mobile telephone apparatus of claim 20 wherein said network interface comprises a non-voice network interface, and wherein said codes for directing said processor circuit to cause said access code request message to be transmitted include codes for directing said processor circuit to cause said access code request message to be transmitted to said access server using said non-voice network interface on a non-voice network.

22. The mobile telephone apparatus of claim 20 wherein said location identifier comprises an IP address of the mobile telephone in a wireless IP network.

23. The mobile telephone apparatus of claim 20 wherein said location identifier comprises an identifier of a wireless voice signal station in wireless communication with the mobile telephone.

24. The mobile telephone apparatus of claim 20 wherein said location identifier comprises a user-configured identifier of a location associated with the mobile telephone.

25. The mobile telephone apparatus of claim 20 wherein said network interface comprises a non-voice network interface, and wherein said codes for directing said processor circuit to receive an access code reply message include codes for directing said processor circuit to cause said access code reply message to be received from said access server using said non-voice network interface on a non-voice network.

26. The mobile telephone apparatus of claim 20 wherein said access code includes a telephone number identifying a channel operably configured to cooperate with an IP network to cause a call involving the mobile telephone and the callee to be routed through the IP network.

27. The mobile telephone apparatus of claim 20 wherein said network interface comprises a mobile telephone network interface, and wherein said codes for directing said processor circuit to initiate include codes for directing said processor circuit to cause a call to be initiated using said mobile telephone network interface on a mobile telephone network.

28. A system for enabling roaming by a mobile telephone, the system comprising the mobile telephone of claim 20 and further comprising:
  a routing controller; and
  an access server comprising a processor circuit and a computer readable medium in communication with the processor circuit, the computer readable medium encoded with codes for directing said processor circuit to:
    receive from the mobile telephone said access code request message;
    communicate with said routing controller to obtain from said routing controller said access code wherein said access code identifies a channel associated with said location identifier and wherein said access code is useable by the mobile telephone to cause the routing controller to establish a call to the callee using the channel; and
    transmit said access code reply message to the mobile telephone.

29. A non-transitory computer readable medium encoded with codes for directing a processor circuit to enable mobile telephone roaming, said codes being operable to direct the processor circuit to:
  receive, from a user of a mobile telephone, a callee identifier associated with a callee;
  transmit an access code request message to an access server to seek an access code from a pool of access codes telephone wherein each access code in said pool of access codes identifies a respective telephone number or Internet Protocol (IP) network address to enable a local call to be made to call the callee identified by the callee identifier, said access code request message including said callee identifier and a location identifier separate and distinctive from said callee identifier, said location identifier identifying a location of the mobile telephone;
  receive an access code reply message from the access server in response to said access code request message, said access code reply message including an access code different from said callee identifier and associated with said callee location identifier and/or associated with a location pre-associated with the mobile telephone and wherein said access code expires after a period of time; and
  initiate a call using said access code to identify the callee.

30. A method for enabling mobile telephone roaming, the method comprising:
  receiving from the mobile telephone an access code request message including a callee identifier associated with the callee and a location identifier separate and distinctive from said callee identifier, identifying a location of the mobile telephone;
  producing an access code identifying a communication channel based on said location identifier and/or based on a location pre-associated with the mobile telephone, said access code being different from the callee identifier and useable by the mobile telephone to initiate a call to the callee using the channel, and wherein said access code expires after a period of time and wherein producing said access code comprises selecting said access code from a pool of access codes, wherein each access code in said pool of access codes identifies a respective telephone number or Internet Protocol (IP) network address; and
  transmitting an access code reply message including said access code, to the mobile telephone.

31. The method of claim 30 wherein receiving comprises receiving said access code request message on a non-voice network.

32. The method of claim 30 wherein producing said access code comprises causing a routing controller operably configured to route a call between said caller and said callee to produce said access code.

33. The method of claim 30 further comprising determining from said location identifier a local calling area associated with the mobile telephone and selecting an access code associated with a calling area matching said local calling area associated with the mobile telephone.

34. The method of claim 33 further comprising accessing a location field of a dialing profile associated with the caller when a local calling area cannot be determined from the contents of said location identifier and determining a local calling area associated with the mobile telephone from the contents of said location field and selecting an access code associated with a calling area matching the local calling area associated with the mobile telephone.

35. The method of claim 30 wherein said location identifier comprises an IP address of the mobile telephone in a wireless IP network.

36. The method of claim 30 wherein said location identifier comprises an identifier of a wireless voice signal station in wireless communication with the mobile telephone.

37. The method of claim 30 wherein said location identifier comprises a user-configured identifier of a location associated with the mobile telephone.

38. The method of claim 30 wherein at least one of said access codes in said pool of access codes identifies an IP network address as a possible channel through which said call can be conducted.

39. The method of claim 38 further comprising enabling communications between said caller and said callee to be established through an IP network in response to a call received at said IP network address.

40. The method of claim 30 wherein said access code request message includes a caller identifier and wherein the method further comprises associating said caller identifier included in said access code request message with the selected access code.

41. The method of claim 40 further comprising associating said callee identifier included in said access code request message with the selected access code.

42. The method of claim 41 wherein said associating said caller identifier and said callee identifier with the selected access code occurs only when:
 a) the access code is not already associated with a callee id; or
 b) the access code is already associated with a callee id, and a timeout value associated with that callee id has expired.

43. The method of claim 30 wherein producing further comprises associating a timestamp with said access code, for use in determining when the usability of said access code to initiate a call to the callee will expire, and causing said timestamp to be included in said access code reply message transmitted to the mobile telephone.

44. The method of claim 43 further comprising enabling communications to be established between said caller and said callee when the mobile telephone seeks to establish a call to said callee using the access code transmitted in the access code reply message when said timestamp associated with said access code indicates the usability of said access code has not expired and not enabling said communications to be established when said timestamp indicates the usability of said access code has expired.

45. The method of claim 30 wherein transmitting comprises transmitting said access code reply message on a non-voice network.

46. A system for enabling mobile telephone roaming, the system comprising:
 means for receiving from the mobile telephone an access code request message including a callee identifier associated with the callee and a location identifier separate and distinctive from said callee identifier, identifying a location of the mobile telephone;
 means for producing an access code identifying a communication channel based on said location identifier and/or based on a location pre-associated with the mobile telephone, said access code being different from the callee identifier and useable by the mobile telephone to initiate a call to the callee using the channel and wherein said access code expires after a period of time and wherein said means for producing said access code comprises means for selecting said access code from a pool of access codes wherein each access code in said pool of access codes identifies a respective telephone number or Internet Protocol (IP) network address; and
 means for transmitting an access code reply message including said access code to the mobile telephone.

47. The system of claim 46 wherein said means for receiving comprises a non-voice network interface for receiving said access code request message on a non-voice network.

48. The system of claim 46 wherein said means for producing said access code comprises a routing controller operably configured to route a call between said caller and said callee.

49. The system of claim 46 wherein said processor circuit is operably configured to determine a local calling area associated with the mobile telephone from said location identifier and to select an access code associated with a calling area matching said local calling area associated with the mobile telephone.

50. The system of claim 49 further comprising:
 a dialing profile associated with the caller, said dialing profile including a location field; and
 wherein said processor circuit is operably configured to determine a local calling area associated with the mobile telephone from the contents of said location field and to select an access code associated with a calling area matching the local calling area associated with the mobile telephone, when a local calling area associated with the mobile telephone cannot be determined from said location identifier.

51. The system of claim 46 wherein said location identifier includes an IP address of the mobile telephone in a wireless IP network.

52. The system of claim 46 wherein said location identifier includes an identifier of a wireless voice signal station in wireless communication with the mobile telephone.

53. The system of claim 46 wherein said location identifier includes a user-configured identifier of a location associated with the mobile telephone.

54. The system of claim 46 wherein at least one of said access codes in said pool of access codes identifies an IP network address as a possible channel through which said call can be conducted.

55. The system of claim 46 wherein said processor circuit is operably configured to enable communications between said caller and said callee to be established through an IP network in response to a call received at said IP network address.

56. The system of claim 46 wherein said access code request message includes a caller identifier and wherein said processor circuit is operably configured to associate said caller identifier with the selected access code.

57. The system of claim 56 wherein said processor circuit is operably configured to associate said callee identifier included in said access code request message with the selected access code.

58. The system of claim 57 wherein said processor circuit is operably configured to associate said caller identifier and said callee identifier with the selected access code only when:
 a) the access code is not already associated with a callee id; or
 b) the access code is already associated with a callee id, and a timeout value associated with that callee id has expired.

59. The system of claim 46 wherein said processor circuit is operably configured to associate a timestamp with said access code, for use in determining when the usability of said access code to initiate a call to the callee will expire, and to cause said timestamp to be included in said access code reply message transmitted to the mobile telephone.

60. The system of claim 59 wherein said processor circuit is operably configured to enable communications to be established between said caller and said callee when the mobile telephone seeks to establish a call to said callee using the access code transmitted in the access code reply message when said timestamp associated with said access code indicates the usability of said access code has not expired and to prevent said communications from being established when said timestamp indicates the usability of said access code has expired.

61. The system of claim 46 wherein said means for transmitting comprises a non-voice network interface for transmitting said access code reply message on a non-voice network.

62. A system for enabling mobile telephone roaming, the system comprising:
 a processor circuit;
 a network interface in communication with said processor circuit; and a computer readable medium in communication with said processor circuit and encoded with codes for directing said processor circuit to:

receive from the mobile telephone an access code request message including a callee identifier associated with the callee and a location identifier separate and distinctive from said callee identifier, identifying a location of the mobile telephone;

communicate with a routing controller to obtain from said routing controller an access code identifying a communication channel, said access code being determined from said location identifier and/or based on a location pre-associated with the mobile telephone and said access code being different from the callee identifier and useable by the mobile telephone to initiate a call to the callee using the channel, and wherein said access code expires after a period of time and wherein said access code is selected from a pool of access codes and wherein each access code in said pool of access codes identifies a respective telephone number or Internet Protocol (IP) network address; and cause an access code reply message including said access code to be transmitted to the mobile telephone.

63. The system of claim 62 wherein said network interface comprises a non-voice network interface, and wherein said codes for directing said processor circuit to receive include codes for directing said processor circuit to cause said access code request message to be received using said non-voice network interface on a non-voice network.

64. The system of claim 62 wherein said codes for directing said processor circuit include codes for directing said processor circuit to cause a routing controller to produce said access code.

65. The system of claim 62 wherein said codes for directing said processor circuit include codes for directing said processor circuit to determine from said location identifier a local calling area associated with the mobile telephone and to select an access code associated with a calling area matching said local calling area associated with the mobile telephone.

66. The system of claim 65 wherein said codes for directing said processor circuit include codes for directing said processor circuit to access a location field of a dialing profile associated with the caller when a local calling area cannot be determined from the contents of said location identifier and determine a local calling area associated with the mobile telephone from the contents of said location field and select an access code associated with a calling area matching the local calling area associated with the mobile telephone.

67. The system of claim 62 wherein said location identifier comprises an IP address of the mobile telephone in a wireless IP network.

68. The system of claim 62 wherein said location identifier comprises an identifier of a wireless voice signal station in wireless communication with the mobile telephone.

69. The system of claim 62 wherein said location identifier comprises a user-configured identifier of a location associated with the mobile telephone.

70. The system of claim 62 wherein at least one of said access codes in said pool of access codes identifies an IP network address as a possible channel through which said call can be conducted.

71. The system of claim 70 wherein said codes for directing said processor circuit include codes for directing said processor circuit to enable communications between said caller and said callee to be established through an IP network in response to a call received at said IP network address.

72. The system of claim 62 wherein said access code request message includes a caller identifier and wherein said codes for directing said processor circuit include codes for directing said processor circuit to associate said caller identifier included in said access code request message with the selected access code.

73. The system of claim 72 wherein said codes for directing said processor circuit include codes for directing said processor circuit to associate said callee identifier included in said access code request message with the selected access code.

74. The system of claim 73 wherein said codes for directing said processor circuit include codes for directing said processor circuit to associate said caller identifier and said callee identifier with the selected access code only when:
a) the access code is not already associated with a callee id; or
b) the access code is already associated with a callee id, and a timeout value associated with that callee id has expired.

75. The system of claim 62 wherein said codes for directing said processor circuit include codes for directing said processor circuit to associate a timestamp with said access code, for use in determining when the usability of said access code to initiate a call to the callee will expire, and to cause said timestamp to be included in said access code reply message.

76. The system of claim 75 wherein said codes for directing said processor circuit include codes for directing said processor circuit to enable communications to be established between said caller and said callee when the mobile telephone seeks to establish a call to said callee using the access code transmitted in the access code reply message when said timestamp associated with said access code indicates the usability of said access code has not expired and to prevent said communications from being established when said timestamp indicates the usability of said access code has expired.

77. The system of claim 62 wherein said network interface comprises a non-voice network interface, and wherein codes for directing said processor circuit to transmit include codes for directing said processor circuit to cause said access code reply message to be transmitted using said non-voice network interface on a non-voice network.

78. A non-transitory computer readable medium encoded with codes for directing a processor circuit to enable mobile telephone roaming, the codes being operable to direct the processor circuit to:

receive from the mobile telephone an access code request message including a callee identifier associated with the callee and a location identifier separate and distinctive from said callee identifier, identifying a location of the mobile telephone;

communicate with a routing controller to obtain from said routing controller an access code identifying a communication channel, based on said location identifier and/or based on a location pre-associated with the mobile telephone, said access code being different from the callee identifier and useable by the mobile telephone to initiate a call to the callee using the channel, and wherein said access code expires after a period of time and wherein said access code is selected from a pool of access codes, wherein each access code in said pool of access codes identifies a respective telephone number or Internet Protocol (IP) network address; and cause an access code reply message including said access code to be transmitted to the mobile telephone.

\* \* \* \* \*

UNITED STATES PATENT AND TRADEMARK OFFICE
CERTIFICATE OF CORRECTION

Page 1 of 1

PATENT NO.        : 8,630,234 B2
APPLICATION NO.   : 13/056277
DATED             : January 14, 2014
INVENTOR(S)       : Bjorsell et al.

It is certified that error appears in the above-identified patent and that said Letters Patent is hereby corrected as shown below:

In the Drawings

Sheet 10 of 17 (Reference Numeral 274, Fig. 12) at line 3, Change "indentifier?" to --identifier?--.

Sheet 11 of 17 (Reference Numeral 316, Fig. 14) at line 1, Change "Identifer" to --Identifier--.

In the Claims

Column 37 line 67, Claim 29, Change "said callee location" to --said location--.

Signed and Sealed this
Fourteenth Day of October, 2014

Michelle K. Lee
*Deputy Director of the United States Patent and Trademark Office*